United States Patent
Kendall et al.

(10) Patent No.: US 11,328,313 B2
(45) Date of Patent: May 10, 2022

(54) PREDICTIVE BOUNDING OF COMBINATORIAL OPTIMIZATIONS THAT ARE BASED ON DATA SETS ACQUIRED POST-PREDICTION THROUGH HIGH-LATENCY, HETEROGENOUS INTERFACES

(71) Applicant: RetailMeNot, Inc., Austin, TX (US)

(72) Inventors: Joe Kendall, Austin, TX (US); Shaun Dubuque, Austin, TX (US); Vivek Sagi, Austin, TX (US)

(73) Assignee: RETAILMENOT, INC., Los Angeles, CA (US)

( * ) Notice: Subject to any disclaimer, the term of this patent is extended or adjusted under 35 U.S.C. 154(b) by 197 days.

(21) Appl. No.: 16/870,172

(22) Filed: May 8, 2020

(65) Prior Publication Data

US 2020/0357012 A1 Nov. 12, 2020

Related U.S. Application Data

(60) Provisional application No. 62/845,069, filed on May 8, 2019.

(51) Int. Cl.
*G06Q 30/00* (2012.01)
*G06Q 30/02* (2012.01)
*G06Q 20/34* (2012.01)

(52) U.S. Cl.
CPC ..... *G06Q 30/0222* (2013.01); *G06Q 20/3433* (2013.01); *G06Q 30/0239* (2013.01)

(58) Field of Classification Search
None
See application file for complete search history.

(56) References Cited

U.S. PATENT DOCUMENTS

| | | | |
|---|---|---|---|
| 8,818,909 B2 * | 8/2014 | Bosworth | G06Q 30/0207 705/319 |
| 9,037,963 B1 * | 5/2015 | Chandi | G06Q 30/0253 715/234 |

(Continued)

FOREIGN PATENT DOCUMENTS

| | | | | |
|---|---|---|---|---|
| JP | 2018073349 A | * | 5/2018 | G06Q 30/02 |
| JP | 2019046173 A | * | 3/2019 | G06Q 30/02 |

(Continued)

OTHER PUBLICATIONS

McKinsey and Company. Marketing & Sales Big Data, Analytics, and the Future of Marketing & Sales. (Mar. 2015). Retrieved online Jan. 2, 2022. https://www.mckinsey.com/~/media/McKinsey/Business%20Functions/Marketing%20and%20Sales/Our%20Insights/EBook%20Big%20data%20analytics%20and%20the%20future%20of (Year: 2015).*

(Continued)

*Primary Examiner* — James A Reagan
(74) *Attorney, Agent, or Firm* — Womble Bond Dickinson (US) LLP

(57) ABSTRACT

Disclosed are techniques for achieving high-volumes of low-latency price plus discount transactions that are dynamically created through transaction optimization. Aspects may include combining and optimizing different types of discounts into a single discount and dynamically controlling the single discount through a single user-facing transaction. A computer model may determine one or more transactions and sets of discounts applicable to those transactions upon which the user-facing transaction and single discount are based. Associations between discounts and items may be determined for at least some different types of discounts to apply a set of discounts including at least two different discounts of different discount types to a desired transaction for one or more items. Aspects may include determining a (Continued)

discount transaction comprising a plurality of constituent transactions that form a single user-facing transaction.

20 Claims, 6 Drawing Sheets

(56) References Cited

U.S. PATENT DOCUMENTS

| | | | | |
|---|---|---|---|---|
| 9,595,049 | B2* | 3/2017 | Showers | G06Q 30/0256 |
| 2006/0022048 | A1* | 2/2006 | Johnson | H04L 67/04 |
| | | | | 235/462.1 |
| 2007/0281719 | A1* | 12/2007 | Bylock | H04W 4/12 |
| | | | | 455/466 |
| 2008/0155591 | A1* | 6/2008 | Mahajan | G06Q 30/02 |
| | | | | 725/34 |
| 2009/0030794 | A1* | 1/2009 | Scheflan | G06Q 30/0277 |
| | | | | 705/14.39 |
| 2009/0070219 | A1* | 3/2009 | D'Angelo | G06Q 30/0258 |
| | | | | 705/14.56 |
| 2009/0119167 | A1* | 5/2009 | Kendall | G06Q 30/0275 |
| | | | | 705/14.17 |
| 2009/0234715 | A1* | 9/2009 | Heiser, II | G06Q 20/10 |
| | | | | 705/14.17 |
| 2009/0287558 | A1* | 11/2009 | Seth | G06Q 30/0221 |
| | | | | 705/14.22 |
| 2010/0120450 | A1* | 5/2010 | Herz | H04W 4/029 |
| | | | | 455/456.3 |
| 2011/0010235 | A1* | 1/2011 | Kenny | G06Q 30/02 |
| | | | | 705/14.23 |
| 2011/0153401 | A1* | 6/2011 | Jellema | G06Q 30/02 |
| | | | | 705/14.26 |
| 2011/0208575 | A1* | 8/2011 | Bansal | G06Q 30/02 |
| | | | | 705/14.25 |
| 2011/0238658 | A1* | 9/2011 | Schimmelpfeng | H04L 41/0856 |
| | | | | 707/723 |
| 2012/0101889 | A1 | 4/2012 | Kurata et al. | |
| 2013/0046610 | A1 | 2/2013 | Abraham | |
| 2013/0117094 | A1 | 5/2013 | Jones et al. | |
| 2013/0238745 | A1* | 9/2013 | Ramachandran | H04N 21/2396 |
| | | | | 709/217 |
| 2014/0025460 | A1 | 1/2014 | Knowles et al. | |
| 2014/0180809 | A1 | 6/2014 | Boal | |
| 2016/0132921 | A1 | 5/2016 | Martinez et al. | |
| 2016/0180366 | A1 | 6/2016 | Ben-Eliezer | |
| 2018/0158552 | A1* | 6/2018 | Liu | G06N 3/0454 |
| 2019/0108541 | A1 | 4/2019 | Pointer et al. | |
| 2020/0012917 | A1* | 1/2020 | Pham | G06F 21/6245 |
| 2020/0167437 | A1* | 5/2020 | Mallya Kasaragod | G06F 30/27 |
| 2020/0167686 | A1* | 5/2020 | Mallya Kasaragod | G06F 30/20 |
| 2020/0167687 | A1* | 5/2020 | Gene | G06N 3/006 |
| 2020/0174486 | A1* | 6/2020 | Luo | B60W 60/0011 |
| 2020/0272853 | A1* | 8/2020 | Zoldi | G06K 9/6256 |
| 2020/0311556 | A1* | 10/2020 | Francon | G06N 3/0454 |
| 2020/0394594 | A1* | 12/2020 | Dvorscak, Jr. | G06Q 10/06315 |
| 2021/0365973 | A1* | 11/2021 | Guild | G06K 9/6256 |

FOREIGN PATENT DOCUMENTS

| | | | | |
|---|---|---|---|---|
| JP | 2019215778 | A * | 12/2019 | G06Q 30/02 |
| WO | WO-3083732 | A2 * | 10/2003 | G06Q 30/02 |

OTHER PUBLICATIONS

McKinsey Global Institute. Artificial Intelligence the Next Digital Frontier? (Jun. 2017). Retrieved online Jan. 2, 2022. https://www.mckinsey.com/~/media/mckinsey/industries/advanced%20electronics/our%20insights/how%20artificial%20intelligence%20can%20deliver%20real%20value%20to%20companies/mgi-art (Year: 2017).*

Venelin Valkov. Smart Discounts with Logistic Regression | Machine Learning from Scratch (Part I). (Mar. 31, 2019). Retrieved online Jan. 2, 2022. https://towardsdatascience.com/smart-discounts-with-logistic-regression-machine-learning-from-scratch-part-i-3c242f4ded0 (Year: 2019).* vendavo.com. Best Practices for B2B Price Rebates and Incentives. (Apr. 19, 2017). Retrieved online Jan. 2, 2022. https://www.vendavo.com/pricing/b2b-rebates-incentives-best-practices/ (Year: 2017).*

* cited by examiner

PREDICTIVE BOUNDING OF COMBINATORIAL OPTIMIZATIONS THAT ARE BASED ON DATA SETS ACQUIRED POST-PREDICTION THROUGH HIGH-LATENCY, HETEROGENOUS INTERFACES

CROSS-REFERENCE TO RELATED APPLICATIONS

The present application claims the benefit of U.S. Provisional Application No. 62/845,069, sharing the same title, and filed on 8 May 2019. The entire content of each afore-mentioned patent filing is hereby incorporated by reference herein.

BACKGROUND

1. Field

The present disclosure relates to combinatorial optimizations executed with distributed computer systems and, more particularly, to predictive bounding of optimization of an objective function based on multiple features, at least some of which are acquired post-prediction, through high-latency, heterogenous interfaces that are, at least in some cases, slower than a latency budget of the prediction.

2. Description of the Related Art

Combinatorial optimization problems occur in many contexts. Examples include canonical challenges from the field of computer science, like the knapsack problem, the assignment problem, the cutting stock problem, the nurse scheduling problem, and integer programming, among others. Often, different categories of items are to be combined in a way that produces some aggregate score for the combination, and that score is to be minimized or maximized.

Existing computing systems for addressing combinatorial optimization problems are not well suited for distributed applications in which data about the items to be combined takes longer to acquire than a latency budget allocated for generating a response to a request from a querying computing device or process. In many distributed applications, different components operate with a latency budget that permits a certain amount of time for a response to a request. Exceeding those budgets can cause other components to fail or impair the user-experience of users interacting with some of the other components. These constraints are difficult to satisfy when performing a combinatorial optimization (e.g., computing a local optimum, a global optimum, or approximation thereof) based on information that takes longer to acquire or is acquired without any latency guarantees. In instances where acquisition of information on which a combinatorial optimization is based exceeds a latency budget (e.g., the optimization procedure is held up by data requests) for generating a response to a request, the delay can cause a cascade of out-of-tolerance process results.

SUMMARY

The following is a non-exhaustive listing of some aspects of the present techniques. These and other aspects are described in the following disclosure.

Some aspects include a technique for achieving high-volumes of low-latency price plus discount transactions that are dynamically created through transaction optimization.

Aspects may include a computer-implemented method for combining and optimizing different types of discounts into a single discount and dynamically control the single discount through a single user-facing transaction. Associations between discounts and items may be determined for at least some different types of discounts to apply a set of discounts including at least two different discounts of different discount types to a desired transaction for one or more items. Aspects may include a computer model configured to determine a discount transaction with a given merchant estimated to provide a lowest price for the items of the desired transaction responsive to an application of an optimal set of discounts with the given merchant out of a plurality of other merchants and a plurality of other sets of discounts applicable to respective ones of the other merchants.

Aspects may include determining a discount transaction comprising a plurality of constituent transactions. The computer model may determine a plurality of constituent transactions that form an optimal discount transaction. A constituent transaction may be determined to provide a lowest price for at least one item or combination of some of the items of the desired transaction responsive to an application of an optimal set of discounts with a different merchant out of a plurality of other merchants, and a set of constituent transactions may be determined to provide a lower aggregate price than a price of any single transaction.

Aspects may determine, for a set of discounts for a given merchant, whether any discounts having unmet criteria are available with the given merchant. Aspects of the computer model may evaluate properties of the desired transaction, such as delivery timing, shipping rates, tax rates, item cost and discount amount for each discount type for the one or more items specified in the desired transaction to determine an estimated price and discount for the transaction and whether discount criteria are met. Aspects of the computer model may determine whether any unmet criteria are within a threshold and indicate one or more options by which the unmet criteria may be satisfied and an associated increase or decrease in price or discount for the transaction for the respective ones of the options which satisfy at least some unmet criteria. Aspects of the computer model may apply thresholds for discounts based on item cost and relative to shipping cost or tax to determine whether a desired transaction should be broken into two or more constituent transactions based on reduction of cost compared to a single transaction for the items contained in at least two constituent transactions.

Aspects of the computer model may output a discount transaction at a discounted price reflecting a discount on the desired transaction relative to an undiscounted price. The discounted price of the discount transaction may be determined based on application of a respective set of discounts to each constituent transaction and presented to the user before any checkout. Aspects of the computer model may determine a discount transaction for the desired transaction at one of the different ones of the merchants based on estimated application of each applicable discount at the appropriate time, including gift card discounts, codes, and cash back offers, etc., for the items and discount transaction to determine a total effective discount relative to a current, undiscounted pricing of those items and the transaction with the merchant.

Aspects dynamically adjust a set of discounts based on available discounts having unmet criteria within a threshold, like a percentage of optimized or desired transaction cost, to determine whether meeting the criteria optimizes the set of discounts. The computer model may determine, for a desired transaction including a selection of items, options to modify the desired transaction or selection of items such as by shipping speed, swapping of a selected item or combination thereof for another item or combination thereof, configuration of a selected item, add an additional item (e.g., like a recommended item based on items included in the desired transaction or purchased in prior transactions) having associated costs which meet unmet criteria for one or more available discounts or meet criteria for an additional or alternate available discount. In some aspects, an option to modify the selection of items for a desired transaction may: increase a component cost at a merchant but reduce a total cost at the merchant by meeting criteria for one or more discounts, increase cost at a merchant but meet criteria for one or more discounts that increase the cost by no more than a threshold amount, decompose a transaction into two or more constituent transactions that meet, or compose a transaction from two or more constituent transaction. Recommendations may be determined based on user purchase history (or histories), like tracked purchases of the user, purchases of other users having purchased items similar to the user, or transactions of other users including one or more items similar to the desired transaction of the user.

The selection of items after modification by selection of one or more options determined to satisfy unmet criteria may be presented to the user in association with the determined change in price and discount. Aspects may dynamically adjust a set of discounts based on existing discounts and available discounts having unmet criteria within a threshold. A determined selection of items may be responsive to user selection of one or more options determine to meet discount criteria within threshold amounts of the transaction cost by user selection of an item to add to a discount transaction or swap with another item of a discount transaction or user selection of different configuration for an item or shipping speed. In some cases, one or more options may be selected automatically within a threshold amount of cost to meet unmet criteria which reduces the discounted cost of the transaction (e.g., by adding an item, selecting an item configuration, or shipping speed which satisfies one or more unmet criteria for available discounts with a merchant). Aspects may dynamically adjust the set of discounts for transactions, including combinations of selected items, to output price and discount values based on user selections from within the determined selections of items and item properties. Aspect may encode, in a data structure, values and functions for modifying a price and discount displayed for a given discount transaction (or in respective ones of constituent transactions) based on a desired transaction, and the functions may be based on selection of one or more options for shipping speed, item configuration, and one or more items to add or swap within a determined selection of items that correspond to candidate discount transactions by which the desired transaction may be satisfied.

Aspects may include receiving a user selection to complete a purchase based on a discount transaction and obtaining payment information and shipping information for the user. Aspects may provision a gift card for a fulfilling merchant specified by the discount transaction with a value corresponding to a merchant price. The user payment information may be charged at the determined discount transaction price rather than the merchant price. Aspects may execute a sequence of steps to trigger each discount in a set of discounts determined for the discount transaction. Some aspects execute a script encoding computer program operations by a browser instance to apply different discount types, which may include at least one affiliate or tracking link and one discount code. The discount transaction and corresponding set of discounts may be processed in accordance with the operations of the script to trigger at least one affiliate or tracking link specified by the set of discounts, adding items specified by the discount transaction to a cart with a merchant, applying a discount code specified by the set of discounts, applying user shipping information specified for the discount transaction, applying the gift card provisioned for the discount transaction, and submitting the transaction with the merchant. Some aspects iterate the above process for each constituent transaction in a set of constituent transaction, where a set of discounts may specify respective discounts for each constituent transaction with a merchant for provisioning the gift card for the respective iteration. Accordingly, some aspects may process a set of constituent transactions to effectuate a discount transaction.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
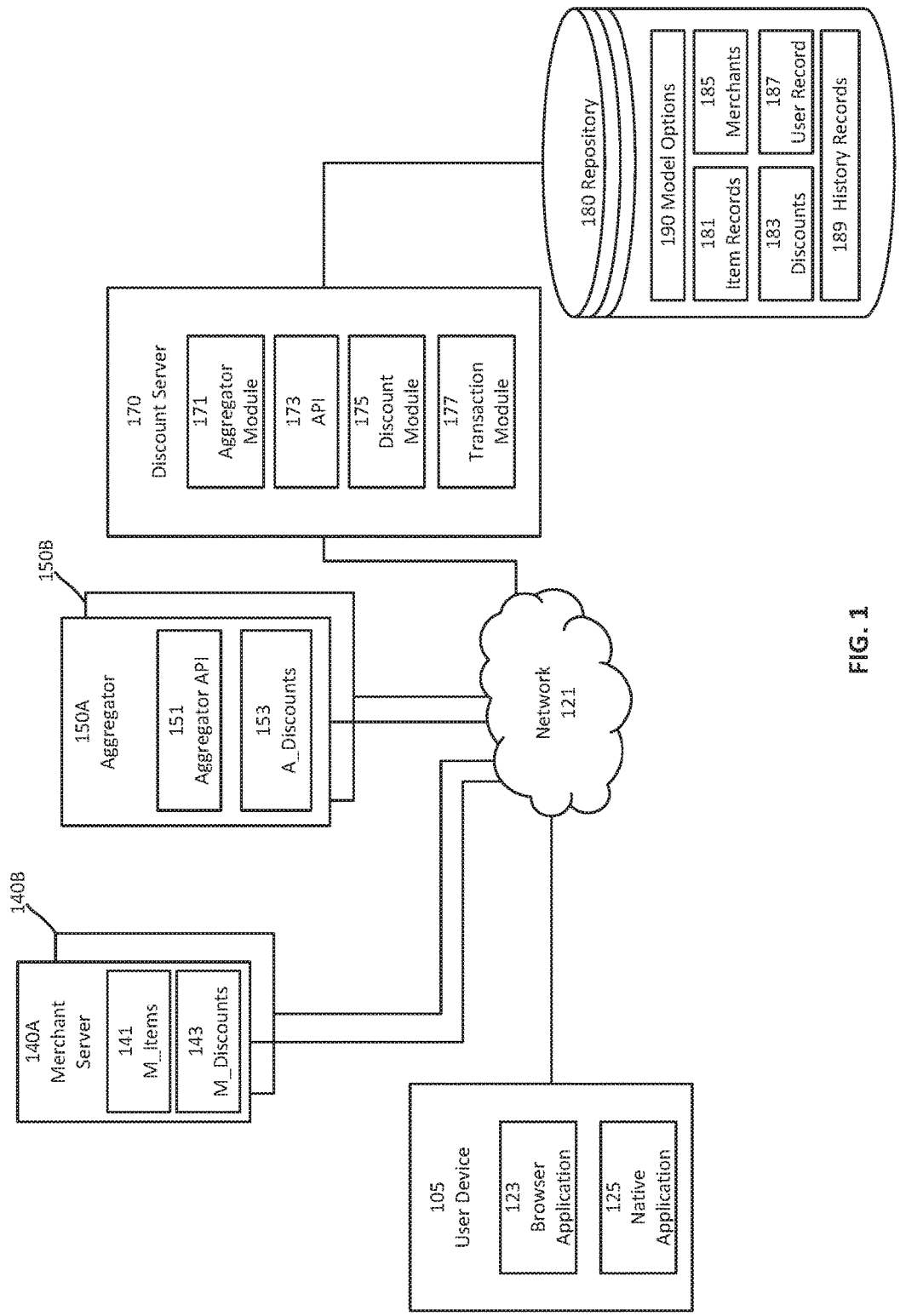
FIG. 1 illustrates an example computing environment of a system configured to dynamically generate an optimized transaction, according to some example embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Examples of the present techniques are described below with reference to a specific category of use-cases, which relate to optimizing the combination of inputs to an online checkout process, e.g., items to be purchased, shipping configuration, potentially stacked discounts, and gift-card balances. This example is chosen because it is expected to be relatable for the lay audience, but the selection should not be taken as indicating that the present techniques are directed to, or limited to, a financial product or service. Indeed, the present techniques are expected to be applicable to the knapsack problem (e.g., where an item's weight-or-volume is behind a high-latency interface and predicted bounds of a total optimized weight are needed); integer programming (e.g., assigning frequencies to cellular towers to maximize service capacity and minimize interferences, where information about usage is behind a high-latency interface); the stock cutting problem (e.g., when a given dimension of components to be cut is behind a high-latency interface), and the like. In these examples, an request from a computing device may need to be serviced within a threshold duration of time, that request may entail a combinatorial optimization based on data that cannot be reliably acquired within the duration of time, and an estimated solution may be computed with techniques like those described below.

Existing computer systems for discount redemption work well in some instances for applying individual discounts to individual orders by testing discount codes, but are deficient in other use cases. Examples include browser extensions that test discounts for customers buying things online, such as by testing a sequence of discount codes. Users (by operation of their computers) often take advantage of an available discount code when purchasing goods and services. For example, a user may enter a discount code at checkout to apply a discount to their purchase. Oftentimes, however, a user's computer is unaware of other applicable discounts or the gamut of applicable discounts. For example, a user may apply a generic $5 off discount code to any purchase because they are unaware of a greater $10 off discount code should their purchase exceed a certain amount. There may also exist additional types of discounts, like cashback or rewards offers redeemable after purchase if the purchase is completed in a particular way and the customer registers with that cashback offer service. Moreover, thresholds for various discounts and their applicability are often unknown.

Some customers recognize that there may be different types of discounts and that sometimes more than one discounts type may be applicable to a purchase. However, the different discounts types behave very differently, take effect at different points in the purchase process (e.g., a cashback offer redeemed after purchase if the customer performs certain steps prior to the purchase or a discount code applied prior to purchase), and require different information and sequences of steps to work. As a result, users rarely take advantage of more than one available discount because the variety of requirements for and timing of discounts means that the user experience of stacking discount types is a complicated, multi-step process that leads to poor or confusing outcomes.

The variety of requirements for and timing of discounts means that the user experience of stacking discount types is a complicated, multi-step process that leads to poor or confusing outcomes. Users desire to obtain the lowest possible price for a purchase, but that desire is muted by the of convenient avenues to efficiently utilize the gamut of possible discount type and identify the best discount of a given type. Rather than present all discounts to a user, discounts applicable to a given transaction a user desires to effect may be identified with respect to a given transaction and even more granularly to individual goods (e.g., items) within the transaction to afford users a lower price for the given transaction. Further, rather than instruct the user how to utilize each applicable discount, a set of discounts may be identified and their effect on the price of the given transaction estimated to determine a discount transaction having a discounted price as the result of application of discounts in the set of discounts. The resulting discounted price for the discount transaction may be presented to the user without requiring the user to step through the application of each identified discount in the set of discounts (if even able, as some types, like cashback offers, may even only manifest as an actual monetary value post-transaction completion). In some cases, price is adjusted to reflect other aspects of a transaction, like delivery times, merchant reputation, and consumer preferences.

The above process, while helpful to present to the user the resulting discounted cost, may fall short in aiding a user in completing a transaction. Moreover, as a multitude of merchants may sell a same item, transactional costs that factor into price of a transaction, such as shipping and applicable taxes may differ between merchants based on factors such as user and merchant location and play a significant role in real transaction price beyond a discounted price estimated for a transaction. Rather than present the above information to the user, these factors may be accounted for in a determination of a resulting discounted price based on identified discounts. Still, even if presented with the resulting discounted price for a transaction, the user is still required to complete the transaction with a merchant, and in specific ways in order to apply different discounts types. While some users may find it acceptable to complete a transaction for a single item or multiple items with a single merchant through instruction of which discounts to apply, it is often the case that a desired transaction includes multiple items, and the greatest discount for the desired transaction might require completing multiple different constituent transactions with the same merchant or with different merchants for different items. Thus, to obtain the greatest discount for a desired transaction, the user is required to effect a multitude of specific transactions (e.g., with specific item(s) and discounts for each) with one or more merchants. In many cases, the merchants differ for at least some of the respective ones of the different ones of the items (and thus constituent transactions) and a different set of discounts is applicable to each transaction. Users, however, may be averse to breaking apart a desired transaction for multiple items into multiple constituent transactions that then must be placed through the same or different merchants with different applied sets of applicable discounts, even if it provides the greatest discount, because that process is cumbersome and requires significant time input. For example, the user might be required to create an account and enter shipping and billing information with each merchant and further ensure they perform the necessary steps to apply each discount type for a respective merchant before completing a give one of the constituent transactions. Moreover, providing shipping, billing information, account, and other personal information to a vast number of merchants significantly opens the attack surface of the user's online identity. None of the preceding should be taken to suggest than any techniques are disclaimed or disavowed.

Some embodiments determine an optimal set (e.g., determine a local or global optimum, or select among a sample based on proximity to a global or local optimum) of discounts and dynamically process multiple types of discounts to generate a single user-facing transaction, which may include constituent transactions under the single user-facing transaction, to mitigate at least some of the aforementioned problems with traditional systems. For example, some embodiments determine associations between discounts and items to which respective ones of the discounts are applicable. Those associations between discounts and items may be determined for at least some different types of discounts to apply multiple different discounts to a desired transaction. In instances where a desired transaction (i.e., a given transaction, which does not require any particular state of mind on behalf of a user) includes multiple items, the desired transaction may be broken apart into a set of constituent transactions that afford a lowest price for a single-user facing discount transaction based on the desired transaction, in some embodiments.

The above and other processes disclosed herein may augment, use, or execute within systems or include portions of systems to obtain, track, and present offers and related data, such as those described within U.S. Pat. No. 9,978,078 titled "Tracking Offers Across Multiple Channels," which is hereby incorporated by reference in its entirety. U.S. Pat. No. 9,978,078 discloses systems and process relevant to tracking, publishing, and evaluating different types of coupons, including affiliate links and cash back offers, codes, and the like, and by processes including: obtaining a coupon issued by a merchant, the coupon being redeemable both on-line, at the merchant's website, and in-store, at a physical location of the merchant; sending the coupon to publishers for presentation to consumers by the publishers on user devices of the consumers; and receiving indications from the user devices of the consumers that the consumers interacted with the coupon, the indications indicating a consumer selection of an in-store redemption option or an on-line redemption option.

FIG. 1 illustrates an example computing environment 100 of a system configured to dynamically generate an optimized (e.g., determine a local or global optimum, or select among a sample based on proximity to a global or local optimum) transaction, according to some example embodiments. The example environment, as shown may include a variety of server computing systems or devices 140, 150, 170 and user devices 105. Various entities may communicate with one or more other entities over a network 121, such as the Internet. In some embodiments, the computing environment comprises a number of user devices 105 and a discount server 170 (which may be implemented as a collection of services running on various hosts, each having executing its own server process, as part of a server-system).

As an example, the discount server 170 and the user device 105 may communicate over the network 121, which may include the internet. A plurality of user devices (e.g., hundreds, thousands, etc.) may also communicate with the discount server 170, and those communications may occur over respective sessions that are concurrently provided to the user devices by the discount server. Examples of user devices may be computing devices such as personal computing devices like a desktop computer or mobile devices such as mobile phones, tablets, laptops, and the like. Examples of user devices may also include personal assistant type computing devices that users utilize throughout their home. One user device is shown, but commercial use-cases are expected to service more than 100 or more than 1,000 concurrent sessions with more than 10,000, more than 100,000, or more than 10 million users in a userbase that is distributed geographically over more than 10,000 square kilometers, e.g., over the United States. The discount server 170 may also communicate with other entities over the network 121, such as with one or more aggregator servers 150 and one or more merchant servers 140.

Functionality pertaining to those user computing devices 105 may differ depending on type. For example, a mobile phone or tablet computing device may utilize a native application 125 consistent with embodiments disclosed herein, and a desktop computing device may utilize a browser application 123 consistent with embodiments disclosed herein. A user device 105, like a mobile phone or tablet, may execute a native application 125 for interfacing with an API 173 of the discount Server 170 to retrieve information about items for purchase in a desired transaction, information about a discounted price and discount transaction for display, options for configuring the discount transaction, and discount transaction order information; and transmit information like shipping information, payment information, selections of desired items, selections of option for a discount transaction, and submission of a discount transaction for processing. Alternatively, a user device 105, like a desktop computing device, may execute a browser application 123 by which information like that described above may be retrieved, displayed, and transmitted via a website or web application interface. Similarly, other types of user devices 105 may include at least one similar application by which information may be exchanged with the discount server 170. The above should not suggest that embodiments are not consistent a mobile phone or table computing device utilizing a browser application 123 instead of a native application 125 or vice versa. For example, either application 123, 125, may be operable to retrieve data from the discount server 170 and present one or more interfaces within which at least some retrieved data is presented to a user of the user device.

As an example, a browser application 123 (e.g., a browser extension, or a browser without such an extension installed) may retrieve web content, render web content, and execute one or more scripts to process records in hierarchical data serialization formats, like JSON (JavaScript™ object notation), or XML (extensible markup language) documents, provided as web content by a server (e.g., a set of multiple servers). In some example, the browser application 123 may retrieve the web content in association with a webpage provided by the discount server 170. The browser application 123 may render the web content and one or more requests may be directed to an application programming interface, such an API 173 of the discount server 170, to retrieve additional or other data. In some examples, the browser application 123 may retrieve the web content in association with one or more requests generated by a plug-in or browser extension, which may include requesting web content or directing one or more requests to an API 173 of the discount server. In some cases, one or more of the functions may be comingled, for example, a plug-in or browser extension may provide some functionality, such as in association with an account of the user or user device (e.g., by cookie value), and web content to which the browser may navigate may provide other functionality. For example, in some embodiments, a plug-in or extension, may identify items within web content or web pages that are accessed by the browser, and indicate to the user those items which the plug-in or extension has identified. The items which the plug-in or extension identifies based on one or more identifies associated with the items (e.g., by SKU (stock keeping unit), part number, brand, title, or other identifiers). For example, the plug-in or extension may receive a list of identifiers by which items may be identified. The identified items may correspond to those items that the discount server 170 maintains item records for, such as to track discounts.

As another example, a native application 125 may retrieve web content, render web content, and execute one or more scripts to process records, like those in JSON, or XML, provided as web content, similar to a browser. The native application 125, however, may request web content like content items for rendering within an interface of the native application instead of requesting a web page including various content items. Additionally, the native application 125 may include one or more functions for which the native application may request or receive values or other data for executing those functions (e.g., similar to those executable scripts or code which a browser might receive and execute). Which is not to suggest that the server 170 cannot execute one or more functions and provide results to either application via an API or hosted web content. In some cases, the native application 125 may request information like that described above via an API.

Various embodiments may include one or more application programming interfaces (APIs) by which data within the example environment 100 may be communicated between various entities. Some APIs may facilitate the presentation of data to users by user devices and receive results of user inputs to user devices. For example, an application 123, 125 executing on a user device 105 may receive information which may be displayed within a user interface (e.g., as one or more UI elements) or otherwise communicate the information to a user in response to receiving the data or other instructions from an API. In another example, an application 123, 125 executing on a user device 105 may cause the user device to transmit user input data or results to the API. As shown, the discount server 170 include an API 173 by which one or more user devices and the server may exchange data. Other APIs may also be implemented within the environment 100. For example, the discount server 170 may utilize an API 151 of an aggregator 150A to retrieve or otherwise exchange data with an aggregator 150A. In some embodiments, the discount server 170 may communicate with two or more aggregators, e.g., 150A and 150B, each of which may implement an API by which the discount server 170 may retrieve data, such as with the aggregator module 171 for processing. In some cases, one or more merchants 140 may also include an API by which the aggregator module 171 may retrieve data (which is not to suggest such data may not alternatively or additionally be obtained from an aggregator 150 or obtained in other ways).

Examples of a discount server 170 may include one or more server computing devices configured to effectuate operations for implementing an improved form of discounts expected to provide a greater reduction in cost and less frustration for user. Embodiments are further expected to provide a user-interface to simplify disclosure and increase transparency of discount transaction costs and options for achieving the greatest value for a discount transaction, where discounted cost presented is realized at time of purchase even for post-purchase discounts relative to traditional computer-implemented discount systems. Some embodiments may ingest various attributes of items, merchant discounts, affiliate discounts, proprietary discounts, manufacturer discounts, user attributes, historical records of purchases, merchant shipping rates, current item prices from merchants, and generate discount transactions having an associated price through transaction optimization. Some embodiments may configure a single discount transaction including items which a user desires to purchase, but which may be provided by one or more merchants, and the single discount transaction may be presented with a single price based on the discounts applicable to the discount transaction within a user interface by which the user may elect to purchase the items. Embodiments may complete the discount transaction, which may include a number of constituent transactions, with a respective merchant (or merchants) by applying a respective set of discounts. The user may be charged the single discount price presented for the discount transaction and the transactions (e.g., orders) effectuated with the merchants are completed at the price of the order with the merchant. A discount model may be encoded for a desired transaction of the user based on a user record and bounded estimated for item prices from different merchants for fulfilling the desired transaction (or multiple constituent transactions) and present options for configuring a discount transaction satisfying the bounded estimates, which may include options for selection of item properties or adding or swapping different items to meet unmet discount criteria. Some embodiments may determine a selection of items to meet the unmet discount criteria and provisionally add one or more items or otherwise specify items configuration (e.g., color, model, etc.) from the determined selection to provisionally meet the unmet discount criteria for the presented price and discount for the discount transaction.

Examples of a discount server 170 may include one or more server computing devices configured to generate discount models, underlying models, and process data by those models or determine data for processing by those models for determinations of price and discounts for transactions, like a discount transaction. Embodiments of a discount server 170 may include one or more modules, such as those illustrated by FIG. 1, that are configured to perform different functions. The disclosure should not be construed to limit disclosed functionality to a given module or element as embodiments contemplate distributing those functions differently, such as among different servers, additional, fewer, or other modules, or other logical structures. Example modules according to various embodiments described herein may include, but is not limited to, aggregator 171, API 173, discount 175, and transaction 177 modules. In some embodiments, a repository 180 stores various data in data structures that are processed by the respective modules and stores results of processing those data structures. In some embodiments, results of one or more processing steps are new data structures (e.g., one or more models, like a underlying models for generating discount models) that are different from the input data structures, examples of which are discussed in greater detail below.

Embodiments of the repository 180 may store data on which various models operate and store data which various models generate. Additionally, the repository 180 may store data which the discount server 170 may provide, or provided results based on, to one or more user device 105, such as via API 173. For example, the repository 180 may store data amount items and discounts, associations between items and discounts, which merchants provide which items, which discounts are applicable to which merchants, and so on in different types of data structures. The various data structure may include information applicable to determining associations between an item available from at least one merchant and at least one discount of a given discount type for the item. In various example embodiments disclosed here, the various data structures include information applicable to determining associations between an item available at a merchant and multiple (e.g., two or more) discount types. For example, the various data structures may indicate availability of one or more discounts of a respective type with a merchant and to which items provided by a merchant those discounts, including, but not limited to discount codes, affiliate links, available stored value or gift cards, and the like, may be applied. Information like that described above may be stored in data structures of different records maintained by the discount server 170 within the repository 180.

In some embodiments, a plurality of item records 181 are maintained within the repository 180 by the discount server 170. An item record 181 may be a data structure that identifies a given item available from one or more merchants. An item record 181 may contain information for the item, such as one or more identifiers, like a SKU, part number, brand, title, etc., and may also include information about the item, like product details for the item. In some embodiments, an item record 181 may correspond to a given SKU or part number or other identifier or combination of identifiers by which a specific corresponding item may be identified and include product details for the item. In some cases, associations between related item records 181, such as for different versions or packaging of the item having one or more different identifiers, may be identified based on an analysis of one or more identifiers and product details. Associations may indicate, for example, other versions of an item, such as where the item is offered in different colors, packaging amounts, type or amount of accessories, etc., and one or more identifiers (e.g., SKU or part number) or product details differ as a result of available configuration options for the item (e.g., which may be offered in red and blue versions and may be available in 2, 6, or 12 count packages, and the like). In some embodiments, an item record 181 may correspond to a set of SKUs or part numbers or other identifier or combination of identifiers by which a set of corresponding items may be identified and include product details for the respective ones of items corresponding to different identifiers. Thus, for example, such an item record may include and indicate associations like those described above for different version of an item in a same record rather than by associations between the different records for the different versions of the item. In either instant, an item record 181 may store information by which a given item may be identified.

In some embodiments, a plurality of discount records 183 are maintained within the repository 180 by the discount server 170. A discount record may identify a discount and properties for the discount. Example properties may include a source of the discount (e.g., from where information about the discount was obtained) and a type of the discount (e.g., whether the discount is a discount code, affiliate link, etc.). In some embodiments, a discount record may identify at least one discount from a given source, like a merchant 140, or an affiliate 150, or a manufacturer (e.g., like a rebate offer), or the discount system 170. In some embodiments, a discount record may identify a plurality of discounts from a given source. A discount record may also indicate what criteria must be met to obtain the discount with a given merchant. For example, a first discount may be applicable after a cart exceeds a threshold amount with a merchant and another second discount may be applicable after a card exceeds a second, greater threshold amount with the merchant. Additionally, a discount may apply to some items and not others, such as based on one or more product details (e.g., one color but not another) or identifiers (e.g., one SKU but not another).

In some embodiments, a plurality of records of merchants 185 are maintained within the repository 180 by the discount server 170. A merchant record may identify information about a corresponding merchant. For example, for each merchant 140 for which the discount server 170 maintains one or more items records 183 within the repository 180, the discount server 170 may also maintain a record 185 of the merchant providing the item. Information stored in a record 185 corresponding to a merchant may indicate information for configuring a script, or include a script, by which a transaction, like an order for one or more items, may be effectuated with the merchant. In some cases, the script or a similar script or information for configuring a similar script may be included by which one or more discounts may be tested on one or more items which merchant corresponding to the merchant records provides. In either example, the script may be configured to specify a configuration of an item (optionally, in some cases, depending on the item or merchant, with a given configuration based on one or more options corresponding to product details) on a server (e.g., 140A) of a merchant, add one or more items to a cart, apply one or more discounts, and optionally (e.g., for a transaction rather than testing) checkout with the merchant. Additionally, a record 185 for a merchant may include information like types of discounts which the merchant accepts (e.g., during checkout, like a discount code, stored value card, or other discount) or are otherwise applicable to the merchant (e.g., like whether the merchant is associated with one or more affiliate links or other discounts).

In some embodiments, the various records stored within the repository 180 may provide for the formation of one or more relationships between a record and one or more other respective records. For example, an item record 181, or identifier within an item record, may be associated with one or more merchants and respective sets of discounts. In some embodiments, an item record 181 may identify one or more sets of discount records, such as a set of discount records where each of the discount records in the set includes at least one discount applicable to the item that stacks with at least one discount in each of the other discount records in the set. Such relationships may also be stored in other data structures, for example, a combined discount record, and the item record stores information about the item and identifies at least one associated combined discount record which may identify one or more sets of discount records. Accordingly, an example of the repository 180 may be a relational database operable to store records by which other records may be identified.

Other database structures may also be used, such as a tree data structure, in which an item record may be stored at top level node that branches to a plurality of other nodes, like intermediate nodes, which may store identifiers to discount records, and some intermediate nodes may further branch to a plurality of other nodes, which may store identifiers to other discount records, and so on until a leaf node is reached. The branches, or edges, traversed from the top node to a leaf node may identify the sets of discount records. A given edge or branch may correspond to a set of discount records (e.g., depending on which subsequent path is taken to a leaf node) which are applicable in combination, e.g., stack, for a greater overall discount when utilized in combination. As an example, a given leaf node indicating a discount for an item and one or more additional intermediate nodes indicating discounts which stack with the given leaf node may be traversed between the leaf node and the node corresponding to the item. Thus, for example, a node corresponding to an item may be identified and those nodes having a connecting edge or branch from the node corresponding to the item may be identified by traversing the tree to determine which discounts are applicable in combination as a set of discounts. The repository 180 may store associations between an item and one or more discounts applicable to that item, like a set of discounts (some of which may be from different sources), applicable to a transaction corresponding to the purchase of the item from a given source. Discounts identified to the set of discounts may stack, a discounted price may be determined based on the application of each discount in the set, and the set of discounts may correspond to a particular merchant. In some embodiments, the order of the different discounts within a set, like a hierarchy, may be indicated by their position within the tree. In other example data strictures, an order of discounts application may be specified based on a hierarchy of discount type, e.g., the order in which individual discounts in a given set of discounts are applied. The various discounts may each be associated with one or more items based on their applicability to that item with a particular merchant. Accordingly, such as based on an item record 181 which identifies a particular item available with one or more merchants, sets of discounts applicable for the item with respective ones of the one or more merchants may be identified.

Other information described herein may be stored within one or more records. For example, records 185 for merchants may include information about shipping rates and locations of the merchant that may factor into cost of an order for one or more items fulfilled by the merchant. In some embodiments, a merchant record 185, which may indicate locations (e.g., by state, county, zip code) of merchants and corresponding criteria by which shipping rates or taxes are applied to fulfilled transactions destined to or originating from the locations. A merchant record 185 may also include information about merchant inventory such as key-value pairs for items and inventory and the like. In some embodiments, a data structure associating an item with one or more sets of applicable discounts may also indicate a further association with a given merchant from which the item is available and to which a given set of discounts apply. For example, the merchant record 185 may be indicated as a leaf node in a tree data structure or otherwise associated with and item record and discount records in a set. Thus, merchant records may be examined to determine whether, such as for a user in a given location, whether that merchant for which a given set of discounts applies provides a better price for an item (or one or more items) than some other merchant based on application of tax, shipping rate, or other factors.

Embodiments of the discount server 170 may additionally store user records 187 within the repository 180. User records 187 may contain information about users of the discount server 170. For example, for a user of a user device 105 which utilizes the discount server 170, the discount server 170 may store geographic location information, like zip code, city, or state, which may be determined based on one or more of data indicative of GPS data or IP address, and which a user may change or confirm based on input of an address for shipping any order. In some cases, user payment information, such as for registered users, may optionally be stored within a user record, although a user may opt out of storage of payment information. User records for registered users may also indicate a purchase history of the user, such as items purchased in prior discount transactions effectuated by the discount server 170, and the user record may indicate one or more of the historical transaction records 189 which correspond to purchases of the user. In some embodiments, user preferences (e.g., user specified or determined based on user feedback) may be stored within a user record of a user, and those preferences, in addition to historical transaction records 189 of the user and optionally other users may be access by the discount server 170 to determine one or more items or configurations of items for a discount transaction as described in greater detail below.

Embodiments of the discount server 170 may additionally store information about fulfilled discount transactions to the repository 180. For example, the discount server 170 may process information about fulfilled discount transactions to generate historical transaction records 189. A historical transaction record 189, such as for a prior discount transaction, may be a single record or multiple records. For example, if a discount transaction included two or more constituent transactions, each constituent transaction may correspond to a different historical record, e.g., because each was fulfilled separately. In some example, information for a constituent transaction stored as a historical transaction record be associated with the other constituent transactions. In some cases, the association may be present in another record, like a user record, which indicates which constituent transaction records correspond to a prior discount transaction for the user.

A historical transaction record 189 may include, for a prior transaction, a shipping destination (which may be genericized to city, state, or zip code), shipping origin, actual shipping cost, shipped weight, shipped dimensions, item dimensions, tax rate applied, transaction price, estimated cost of transaction, determined price and discount of transaction (and optionally of transactions not fulfilled), discounts in the set of discounts which were applied to the transaction, and other transaction information discussed herein. In some embodiments, such as where a single discount transaction includes constituent transactions fulfilled by different merchants to complete the single discount transaction, the above information may be included as a whole, as components for the constituent transactions fulfilled by the different merchants, or both. In some embodiments, the discount server 170 may update at least some other records based on historical transaction records 189. For example, merchant records 185 may be updated based on tax rates or shipping rates applied to prior transactions maintained in the historical records 189. User records 187 may be updated based on fulfilled transactions, such as to indicate which historical records 189 correspond to the user, and the like. Additionally, in some cases, an item record 181 may be updated based on the historical records 189, such as to indicate whether one or more items were determined to be out of stock, no longer available, or a price for the item with a given merchant changed. Embodiments of the repository may also store discount model options 190, which may include one or more models for constructing discount models for determining or modifying discount transactions as discussed in greater detail below and with reference to FIG. 2.

In some embodiments, the discount server 170 may populate at least some data stored in the repository 180 based on information obtained from an aggregator 150. For example, in some embodiments, the discount server 170 generates discount records 183 that are populated with data based on at least some discount information obtained from an aggregator 150, which may include an API 151 by which aggregated discounts 153 may be retrieved by the discount server 170. The aggregator module 171 of the discount server 170 may poll the API 151 of aggregator 150A to retrieve aggregated discount 153 information. Other APIs of other aggregator servers 150B may also be polled by the aggregator module 171 to retrieve aggregated discount information from other sources. The aggregator module 171 may process retrieve aggregated discount 153 information to generate or update one or more discount records 183 stored within the repository 180.

In some embodiments, aggregated discounts 153 obtained from a given aggregator (e.g., 150A) include one or more types of discounts. For example, aggregated discounts 153 may include: one or more affiliate discounts, like links, applicable to different merchants (e.g., of which two merchants 140A and 140B are illustrated, but there may be hundreds or thousands of such merchants), which may include or otherwise be associated with a cash back offer; one or more cash back offers distinct from various affiliate links; one or more discount codes applicable to the different merchants; one or more rebates applicable to the different merchants; one or more rebates applicable to one or more items provided by one or more merchants; or other example types of discounts described here. In some embodiments, an aggregator, such as aggregator 150A, may scrape merchant websites and associated social media accounts for discounts, receives tracked user input of accepted discount codes such as via a browser extension, direct user feedback, and the like. In some embodiments, the aggregator 150A obtains (e.g., via purchase or exchange) gift cards (e.g., $2^{nd}$ hand from users or other sources) and provides an API 151 by which one or more gift cards may be provisioned at a discount. In some embodiments, an aggregator 150 may be a social media server by which merchants 140 may advertise one or more offers. Thus, an aggregator 150A, 150B may be a server of a party other than a merchant by which information about one or more discounts on items provide by merchants may be retrieved.

As described above, one or more functions of an aggregator, such as aggregator 150A, may be separate from the discount server 170. Thus, the discount server 170 may retrieve aggregate discount 153 information via an API which the aggregator exposes to the discount server. However, some embodiments of a discount server 170 may incorporate one or more aggregator functions, such as in the aggregator module 171. For example, in addition to, or instead of, polling one or more aggregator APIs 151 for information, the aggregator module 171 may include functionality like that of an aggregator for obtaining gift cards from users, managing affiliate links, obtaining discount codes, cash back offers, and the like. In some embodiments, the discount server 170 may include an aggregator module 171 by which one or more such functions are implement and which may also obtain at least some information from one or more other aggregators 150A, 150B.

In some embodiments, instead of, or in addition to, obtaining aggregated discounts from one or more aggregators, the discount server 170 may populate at least some data stored in the repository 180 based on information obtained from merchants 140. For example, an aggregator module 171 of the discount server 170 may generate or update one or more discounts records 183 based on at least some merchant discount information 143 obtained from merchant servers 140. The aggregator module 171 may obtain merchant discount information 143 from merchant server 140A, and the discount information may indicate one or more discounts applicable to one or more items 141 provided by the merchant. Merchant discounts from other merchants may be obtained from other merchant servers, such as merchant server 140B, which may provide discount information that indicates one or more discounts applicable to one or more items provided by the corresponding merchant.

In some embodiments, such as in response to obtaining merchant discount 143 information, aggregator discount 153 information, or otherwise obtaining discount information, the aggregator module 171 or other module of the discount server may test one or more discounts with respect to one or more items 141 provided by a merchant (e.g., available for order via a server 140A of the merchant). The discount server 170 may test obtained discounts on one or more items, and combinations of items, available for order via a merchant server 140A (such as on a website of the merchant hosted by the server) based on the discount information to determine any restrictions or other criteria related to discounts, which may be codes or automatically applied to transactions through the merchant. For example, the aggregator 171 (or another module, like the transaction module 177, such as in response to a request to validate one or more discounts with a merchant) may build a cart and proceed through a checkout process less final submission of an order to determine applicability, restrictions, exclusions, combinations and the like for different obtained discounts from the corresponding merchant and other sources (such as from one or more aggregators or otherwise obtained by the aggregator module 171).

In some embodiments, the aggregator module 171 obtains stored value cards, or gift cards, on a stored value card exchange or otherwise from users. Stored value cards obtained may be applicable to respective ones of the merchants 140 for which the discount server 170 determines discounts on items provided by the merchant. The stored value cards may be obtained second hand, such as by users exchanging a stored value cards for credit or cash value on the exchange. In some embodiments where credit is granted, stored value card credit information for a user may be stored in the corresponding user record of the user within the repository.

In some embodiments, the discount server 170, such as in association with obtaining discounts from a merchant server, obtaining information about items offered via the merchant server, or testing discount codes, may generate or updated one or more merchant records 185 within the repository 180. In some embodiments, merchant records 185 are generated for respective merchants 140A, 140B and are populated with at least some information about the merchant and items offered via the merchant that may be obtained from merchant servers 140 or aggregators 150, such as item availability or inventory of an item, which may be tested by attempting to build a cart to determine with an item is out of stock or available for a given quantity applied and whether the item is available for backorder. The above operations may be performed by an aggregator module 171 at least in some embodiments. In various embodiments, aggregators may also provide some information regarding availability or stock of an item at one or more merchants 140.

The data stored in the repository 180 within one or more data structures may include one or more models or model data, such as for determining one or more discount models and storing model option data 190. In some embodiments, a discount model may include executable code, like a module, which may be loaded into a memory and executed by a processor and provide one or more outputs based on one or more inputs. For example, the discount module 175 may perform one or more operations corresponding to a discount model. In some cases, the discount module 175 may determine or select from various model options 190 to provide one or more functions for modifying a discount transaction to a user device 105, which may execute the functions based on selected options. In other embodiments, the discount module 175 may determine and provide results to the user device 105. In some embodiments, a discount model may include the various weights or configuration data for a model which may be loaded into memory to configure a model to provide one or more outputs based on one or more inputs and the loaded weights or configuration data. Various examples of models are discussed herein and the data corresponding to those modeling techniques or computer models generated by those modeling techniques may be stored within the repository 180. For example, a discount model (or model data) may be generated or otherwise determined based on one or more training operations. In various embodiments, training techniques may be iterative and executed when new or updated training data is obtained or identified.

In accordance with at least some techniques described herein, a model may be trained on various data stored within the repository 180. The training records may be selected from historical transaction records 189, or a subset thereof. Other records may also be utilized, for example, item records 181, discount records 183, and merchant records 185, which correspond to the data indicated by historical transaction records. In some embodiments, the repository 180 may include a number of seed historical transaction records 189, such as records corresponding to one or more tested transactions, which may not correspond to an actual fulfilled transactions, but rather transactions tested based on potential geographic locations of users and potentially applicable discounts (e.g., population of a cart for one or more items for shipping to a particular location, like a particular zip code, and application of one or more discounts by which the effects or applicability of one or more discounts on various items provided by a merchant may be determined).

The discount module 175 may determine underlying models for generating price and discount transactions for users based on the information stored in the database. When a user interacts with the discount server 170 via their user device 105 to browse items, such as items corresponding to item records, the discount module 175 may receive a selection of items the user desires to purchase in a desired transaction. The discount module 175 may obtain the corresponding item records, the corresponding user record, and generate a discount model for the desired transaction based on model option data 190 stored within the repository. The discount model may include a data structure encoding options for configuring a discount transaction at a discount price, subject to the different options selected by the user, and the discount module 175 may determine various ones of options for configuring the model based on the model option data 190. The discount model may be configured to generate a user interface or data backing a user interface configured to display a price and discount for a discount transaction based on the selections of the user, such as based on configuration of an item or items from a determined selection of items to meet any unmet discount criteria. The discount module 175 may set one or more options for the discount model based on model options 190 stored within the repository. The discount model may specify options which correspond to one or more transactions, respective sets of discounts for the transactions, and the respective merchants for the transactions that underlay a displayed price and discount for a single discount transaction.

In some embodiments, the discount module 175 receives as input a desired transaction and outputs a discount transaction and a set of discounts based on associations between discounts and items specified in the desired transaction. The discount transaction may be an optimized transaction by which items specified in the desired transaction (or versions of those items specified or similar items to those specified, such as selected by the discount module 175 as options for satisfying criteria for one or more discounts) may be processed with a merchant with the lowest cost to the user. In some embodiments, the discount module 175 outputs a discount transaction, which may include a set of constituent transactions for the discount transaction and a set of discounts applicable to each of the constituent transactions. The set of constituent transaction for the discount transaction may be an optimized discount transaction by which the desired transaction may be processed with one or more merchants for a lowest aggregate cost to the user (e.g., having a lower aggregate cost than any single transaction with a single merchant).

In some embodiments, one or more discount functions, like functions constituting a lightweight model, corresponding to an optimized discount transaction for which a limited set of options that satisfy various discount criteria, and the associated options are output by the discount model 175 for modifying the discount transaction, such as based on the desired transaction, model option data 190, and the user record of the user. For example, further optimization may be afforded to the user by identification of options, which correspond to changes in shipping speed, item configuration, item swaps or additions, and selection of one or more options causes an increase or decrease in price or discount of an optimized discount transaction based on the functions. In other words, in some cases, an optimized discount transaction may be viewed as a transaction for which there exists multiple other possible candidates for the transaction that correspond to different discount transactions in accordance with selection of one or more options. Those variations on the optimized discount transaction may be encoded in a data structure including the above described discount functions by which execution of one or more discount functions for a selection of options may output a price and discount for a single-user facing representation of the optimized discount transaction having that selection of options.

As noted above a single user-facing transaction may be based on an underlying transaction or a number of constituent transactions which satisfy criteria for various discounts. The above described options, in some cases, may be user selectable options, which afford a greater discount (which need not always correspond to a lower discounted price, e.g., an option may be presented to add an item for $5, where the item actually costs $25, but satisfies a discount by which the price is reduced by an additional $20). In some cases, an identified option may be automatically selected, such as in association with determination of the optimized transaction, e.g., if increasing shipping speed for additional cost reduces cost by meeting criteria for a discount, and user configuration of other options may cause that option to be unselected, e.g., if the user adds an item that satisfies the criteria for which the additional cost of shipping satisfied. Similarly, an item within a threshold value and that reduces cost by satisfying discount may be automatically selected and options may correspond to the opportunity to swap out or add other items that also satisfy the discount criteria but which may increase cost (e.g., due to being higher price than the automatically added item).

An optimized transaction (or each a constituent transaction) may identify one or more items and configuration for those items from (or relative to, e.g., for swapped or added items or where the configuration differs from) the desired transaction and the set of discounts (e.g., an optimized set of discounts) applicable to the transaction, where the set of discounts also specifies how the optimized transaction (or a given constituent transaction) should be completed. An example set of discounts for an optimized transaction might specify a given cash back offer (e.g., based on an affiliate link or other cash back offer) applicable to a given merchant, one or more discount codes to apply with the given merchant, and a stored value card discount applicable to the given merchant. The set of discounts may also indicate whether there are any discounts available with the given merchant having unmet criteria or otherwise, such as a shipping discount based on amount spent with the given merchant or any rebates on one or more of the items (e.g., from a manufacturer for purchase of an item, a set of items, or total amount spent).

The discount module 175 may further evaluate configuration options for the desired transaction, such as delivery timing, shipping rates, tax rates, item cost and discount amount for each discount type for the one or more items specified in the desired transaction. For example, the discount module 175 may access model option data 190 based on historical transaction records, merchant records, and item records based on items in a desired transaction. The model option data 190 may specify thresholds for identifying discounts which may be applied based on item pricing and relative to shipping cost or taxes to determine whether a desired transaction should or could be broken into two or more constituent transactions that satisfy or could satisfy one or more discounts to optimize a discount transaction corresponding to the desired transaction. The discount model 175 may dynamically adjust a specific discount or relative value of each discount type (applicable stored value card discount, applicable cash back, applicable discount codes, applicable offers (e.g., free or discounted shipping based on amount spent) not requiring a code, rebate offers, etc.) by selection of one or more options and possible values for those options. The options and their possible values may be encoded in a data structure by which those options and their possible values may be presented to a user for selection and subsequently processed by one or more functions to output a discounted price and discount for a discount transaction. In some embodiments, the discount module 175 may receive as input one or more optimization targets, such as based on model option data 190 or user preferences (e.g., as indicated by a user record), which may activate or deactivate one or more thresholds, to target a specific outcome or combination of outcomes like greatest overall savings, profit margin, fastest delivery, or biasing item selection to one merchant over another (e.g., to minimize number of constituent transactions, meet an amount spent for applicable code or offer, etc.).

In some embodiments, based on one or more of the above described inputs, the discount module 175 outputs an optimized discount transaction indicative of a discount price and discount on items selected (e.g., for which a configuration thereof may be specified) for a discount transaction based on the items specified by the desired transaction relative to an undiscounted price. The discounted cost of the discount transaction may be determined based on application of a respective set of discounts to each constituent transaction and presented to the user before any checkout. For example, before checkout, the discount module 175 may receive as input one or more identifiers for an item or item records, such as for a desired transaction including a number of items. Items specified in the desired transaction may be matched to item records in a database and obtained. For example, the discount module 175 may obtain one or more items records based on an identifier associated with an item of a desired transaction. In some cases, related item records may be obtained, such as those corresponding to different versions or configurations of an item of a desired transaction, or an alternative branding, or brand, or packaging, and the related item records may be identified based on a corresponding of information between item records—for example, in the identifiers and product details (e.g., a difference of a SKU and indicated color where the data otherwise corresponds between two item records may be indicative of an item having different color versions). In some cases, in item record may encode information about the different version of the item such that matching of an identifier corresponding to an item of a desired transaction may identify the corresponding item and also those related versions or other configurations (e.g., a different amount of the item in a package).

Additionally, an item record, or data structure, may include information about associations of the item record to other records within the repository 180, such as discount records 183 and records of merchants 185 from which an item (or related items corresponding to one or more versions or different configurations of the item) may be purchased. The associations with discount records 183 may indicate, for example, which discounts are applicable to the item. The associations may also indicate, within the discount records 183, one or more sets of discounts which may include two or more discounts that are applicable to an item or version or configuration thereof in combination, and which are applicable in combination to a given merchant. For example, a data structure may indicate by edges or key-value pairs a set of discounts (e.g., by identifying one or more discount records) and a merchant (e.g., by identifying a record of a merchant) for which the set of discounts may be applied to a transaction for purchasing one or more items.

Where applicable, an item record may also include information about item options or properties, such as color, size or other properties, for which the user may indicate a preference or no preference for in the desired transaction (e.g., by selection of a tablet computer with no color preference or a black version of the tablet or a white version of the tablet computer for the desired transaction). The discount module 175 may identify, for the various versions or configurations for an item as indicated by at least one item record, one or more sets of discounts with respective merchants for those different configurations or versions of an item. The discount module 175 may determine, such as based on or more thresholds specified in the model option data 190, which item versions or configurations having a given set of discounts with a respective merchant to process for generating an optimized discount transaction which may indicate a price and discount on the different ones of version or configuration of the item (e.g., black-128 gb tablet X, or white-128 gb tablet X, black-64 gb tablet X, etc.) from which a user may select from. In the above example, a user may be presented with an option to select a color (e.g., black or white) for a 128 gb version of tablet X for which associated price and discount are indicated with each, and an option to select a capacity (e.g., 64 gb vs 128 gb) for tablet X for which associated price (e.g., lowest of the two colors for 128 gb and the price for the 64 gb) and discount are indicated with each.

In some embodiments, an item record includes information about, or associations to other records that indicate an availability and current pricing for the item at different merchants. In some embodiments, the discount server 170 obtains availability or pricing from the different merchants when the item record is obtained. In some embodiments, the item record is updated based on the obtained availability or pricing information. In some embodiments, an item record includes information about, or associations to other records that indicate shipping rates or tax rates for the different merchants. The discount server 170, such as with the discount module 175, may process at least some of the above-mentioned information and outputs a discount transaction having an associated price reflecting application of a determined set of discounts relative to an undiscounted cost and the determined difference afforded by the discounts. For example, the discount module 175 may determine, based on input information like destination/delivery timing/item preferences/etc. of a desired transaction, identified item records for items of the desired transaction, and discount/pricing/shipping/tax/etc. information associated with one or more merchants from which items indicated in the item records may be obtained, a discount transaction for the desired transaction at one or more of the different ones of the merchants based on estimated application of each applicable discount in a set of discounts at the appropriate time, including stored value card discounts, discount codes, and cash back offers, etc., for the items and discount transaction to determine a total effective discount relative to a current, undiscounted pricing of those items from the merchant. In instances where the discount module 175 determines a set of constituent transactions for the discount transaction, for each of the constituent transactions an effective discount relative to current, undiscounted pricing for corresponding items may be determined, and the respective values summed to determine the total effective discount relative to current, undiscounted pricing (e.g., from a single merchant in a single undiscounted transaction or minimal number of undiscounted transactions where a single merchant does not provide each item).

In some embodiments, the discount module 175 may dynamically adjust a set of discounts based on available discounts having unmet criteria within a threshold, like a percentage of optimized or desired transaction price, to determine whether meeting the criteria optimizes an amount of overall discount afforded by adjustments to the set of discounts. For example, a set of discounts may be optimized by increasing amount spent by $1 more on a $98 transaction to meet criteria of free shipping discount on orders over $99 from a merchant where orders less than $99 have a shipping cost greater than $1. More generally, if an estimated shipping cost is X, and the difference between the transaction price and unmet discount criteria is Y, if X is greater than or equal to Y, adding an item or items having a cost of approximate to, e.g., not to exceed a threshold amount greater than X minimally increases transaction cost as a result of meeting the criteria for a greater discount (e.g., free shipping), or if the item or items are less than X and greater than Y decreases transaction cost as a result of meeting the criteria for the greater discount. In the specific example, items provided by that merchant may be evaluated to determine a selection of an item or items to increase the amount spent with the merchant by at least $1 to optimize the set of discounts. In some embodiments, the selection of items may include recommended items (e.g., based on other items included in the desired transaction) having values that if added to the transaction increase the amount spent on items of the transaction to meet the criteria but without, after discounts are applied, increasing total cost of the transaction (or increasing total cost of the transaction by no more than a threshold amount). Recommendations may be determined based on user purchase history, like tracked purchases of the user, purchases of other users similar to the user, or similar purchases to the desired transaction by other users. For example, in processing transaction history records 189, the discount module 175 may determine frequencies (e.g., like weights) of co-occurrence indicative of the tendency of combinations (e.g., pairwise or greater) of items to occur in same fulfilled transaction (e.g., either in a constituent transaction or set of constituent transaction) or to occur in different fulfilled transactions for a same user. The model option data 190 may indicate one or more thresholds or criteria which the discount module 175 may evaluate relative to discounts indicated by a set of discounts, prices, and configurations or versions of items (such as desired items, selected items, related items, or items for adding or swapping) by which an adjustment may be executed or an option corresponding to a determined adjustment may be presented to a user in association with a discount transaction to satisfy unmet criteria to dynamically adjust one or more discounts in a set of discounts for recommended items.

In some embodiments, a selection of items determined to satisfy unmet criteria may be presented to the user in association with the determined change in price and discount. Following the above example, if shipping is $15, adding a $1 item may be indicated along with a discount transaction cost responsive to the item providing a lower transaction cost and adding a $20 recommended item may be indicated along with a discount item value responsive to the item increasing transaction cost but providing a greater discount, e.g., add a $1 poster to save $14 or add a $20 wrench set for only $4. Similarly, a coupon code may provide $15 of orders of $99 dollars or more, for which a determination of a selection of an item or items is equally applicable. Similarly, in another example, such as to meet criteria for a manufacturer rebate, the discount module 175 may evaluate items provided by that merchant by that manufacturer (e.g., in instances where the transaction already includes one or more qualifying items for the rebate) to determine a selection of an item or items to increase the amount spent on items from the manufacturer that qualify for the rebate. One or more of these types of discounts may stack (e.g., are applicable in combination, such as $15 off coupon code on orders over $99, free shipping on orders over $99, and a manufacturer rebate applicable to one or more items of the transaction). The model option data 190 may indicate one or more thresholds or criteria which the discount module 175 may evaluate relative to discounts indicated by a set of discounts, prices, and configurations or versions of items (such as desired items, selected items, related items, or items for adding or swapping) by which an adjustment may be executed or an option corresponding to a determined adjustment may be presented to a user in association with a discount transaction to satisfy unmet criteria of two or more discounts which stack.

In some embodiments, the discount module 175 may dynamically adjust a set of discounts based on existing discounts and available discounts having unmet criteria within a threshold. For example, rather than indicating that the user should add a $1 poster to save $14 in the example above, the poster (or other item, like the wrench set), may be provisioned in the discount transaction as a free gift. An increase in cost, like for the wrench set, may be accounted for by reduction in discount (e.g., a $30 savings based on stored value card discounts may be reduced to $26 to cover the increase in cost resulting from provision the wrench set, such as if the transaction cost in the above example is $80 and $19 more dollars is required to meet the free shipping criteria). In some cases, a determined selection of items from which the user may select one or a combination of items (e.g., up to a certain value) may be presented to provider richer offers responsive to meeting discount criteria within threshold amounts of the transaction cost. Thus, for example, for a discount transaction, an item may be added or swapped in (e.g., a higher quality or quantity) automatically, or a determined selection of items presented for user selection therefrom to create a richer offer with a greater overall discount (even where one discount may be slightly lowered to covers costs to increase another). The model option data 190 may indicate one or more thresholds or criteria which the discount module 175 may evaluate relative to discounts indicated by a set of discounts, prices, and configurations or versions of items (such as desired items, selected items, related items, or items for adding or swapping) by which an adjustment may be executed or an option corresponding to a determined adjustment may be presented to a user in association with a discount transaction to satisfy unmet criteria and dynamically adjust a presented discount based on discount criteria satisfied by the adjustment.

In some embodiments, the unmet criteria within a threshold may be satisfied by addition of an item having redeemable value, like a stored value card having a denomination satisfying the unmet criteria. In some instances, a stored value card may be selected to meet unmet criteria based on user purchase history with the merchant, such as if the user frequents the merchant or the merchant carries types of items frequently purchased by the user, as indicated by the user record. The stored value card may be indicated to the user within the discount transaction interface as a free reward, and, in some cases, the user may elect to return the stored value card to the discount server 170 to obtain a cash back reward as a fractional value of the face redeemable value, e.g., 60-80% returned as cash value. Some embodiment may present an option to preliminary apply the cash back reward within a discount interface to reduce a price of the discount transaction, and the reduce price may be the final price paid by the user (although the user payment method, e.g., a credit card, may be pre-charged for the price less reduction) provided the user supplies stored value card access information to the discount server 170 within a threshold period of time (e.g., 24-48 hours). If the stored value card is not returned within the threshold period of time the pre-charged price may be the final price paid, although the returned cash value offer may remain valid or based on a current market price if the user elects to return the stored value card after the threshold period of time. Thus, for example, some embodiments of the discount module 175 may determine to satisfy unmet criteria with rewards that obtain a greater discount for the user and may optionally be returned for an even greater discount if fed back into the system, such as based on model option data 190 that indicates one or more thresholds or criteria (e.g., based on possible values of stored value cards offered by a merchant, whether the stored value card satisfies an additional discount, and an aggregate transaction cost is reduced for a current cash back evaluation, like a market rate, of the stored value card) for adding a stored value card as an item to a transaction to satisfy unmet criteria.

Embodiments of the discount module 175 may dynamically adjust the set of discounts for transactions, including combinations of selected items, to output price and discount values. In some embodiments, the output price and discount values and optionally functions (e.g., encoding changes in price and discount different combinations of options) are encoded in a vector, or as values and functions in some other data structure, like XML, document or JSON script, or a tree data structure where the branches encode different sequences constituent transactions for different combinations of items, determined and output by the discount module 175 based on model options data 190. The data structure may specify values and functions for modifying price and discount values of a discount transaction (or in respective constituent transactions) based on the determined selection of items (e.g., for the various versions and configurations thereof) that may be configured for, added to the discount transaction, or swapped with the items of the discount transaction. Further, in some embodiments, the values and functions for modifying price and discount of a discount transaction may encode changes for user selections that often occur during a checkout process, like shipping expediency or taxes for added or swapped items, such as by the discount module 175 determining increased stored value card amounts for procurement at a determined discount cost to fully cover cost with the merchant including shipping fees for different expediency values (e.g., overnight, 2-day, or economy) and taxes for different combinations of respective ones of the items of the discount transaction and those in the determined selection of items that a user may elect to add to the discount transaction or swap with existing items of the discount transaction.

In some example embodiments, the data structures encoding values and functions for modifying price and discount values provide a rich checkout experience without requiring re-computation for a desired transaction by the discount module 175 in many instances because the different combinations of items (which may include granularity based on version or configuration options like size/color/quantity), shipping expediency, and the like and their effect on the price and discount for a discount transaction may be processed by functions based on values corresponding to the different possible selections encoded within the data structure. For example, a function may specify conditional changes to the desired transaction such as by which merchant a transaction is competed through and the resulting change in price and discount values should the user elect a white tablet computer vs a black tablet computer. Further, those changes in price and discount values may be displayed as component values relative to items or configuration of items for selection.

In some embodiments, as described above, for each merchant who can fulfill a discount transaction or a constituent transaction, an undiscounted price for a transaction with the merchant may be compared to the optimized total discount for the transactions to determine a single effective discount and resulting price for the discount transaction (or component discount of a constituent transaction which may be aggregated with the component discounts of other constituent transactions within a set of constituent transactions). The single effective discount may be further incentivized based on one or more discount types applied to reach the effective discount, such as those discount types controlled by the system, like stored value cards or cash back offers, through time limiting a particular discount. For example, a discount transaction may be incentivized by an additional 5% discount on transaction costs covered by a preliminary reserving of one or more applicable stored value cards in inventory if the transaction is completed within a certain time, like 2, 5 or 10 minutes. Similarly, a discount transaction may be incentivized by an additional 1% discount on transaction costs subject to a cashback offer if the transaction is completed within a certain time, like 2, 5 or 10 minutes. In other words, the discount system may limit some discounts to reserve a portion of some discounts to incentivize timely purchases, and the thresholds and amounts for applying and specifying those incentives may be based on model option data 190. For example, the model option data 190 may specify a threshold time and amount of an incentive for the threshold period of time when a particular discount in a set of discounts is applicable to an optimized discount transaction. The above described incentivization determination may be based on a lower and upper bound of determined cost, e.g., if a transaction need be effected without access to a stored value card at a discount as an upper bound and providing of one or more lowest cost currently available stored value cards as a lower bound. In some embodiments, a user may be permitted to queue a transaction (e.g., if an incentivization period expires or one or more discounts, like stored value cards, are expected to become available within a projected threshold period of time, like one or more hours or days, or within a week), such as based on a discount based on the lower bound cost, when discounts are available to the discount server 170 to execute the transaction at a price based on that discount.

The above processes describe one or more steps to determine a discount transaction with associated price and discount values for one or more items a user desires to purchase. The discount system, such as provided by the discount server 170, may execute the above process without actively checking the user out. Moreover, the discount transaction need not necessarily match up to a single transaction through a merchant as it may be defined by a set of constituent transactions specifying different merchants, or even multiple different transactions through a same merchant. Additionally, a single effective discount need not necessarily match up to an overall discount obtained, such as, for example, by limiting amounts afforded by one or more discounts as a cushion due to possible delays between when availability is determined and when a transaction is fulfilled. However, the single effective discount and price within the system can be presented to look and feel like a typical online checkout experience. Should the user choose to move forward with the purchase, the user may checkout with the discount system by providing payment information and completing shipping destination information. In turn, the user may submit the discount transaction for processing to complete the checkout. Thus, for example, the discount system may charge the user according to the provided payment method at the discount transaction cost. In embodiments, such as where available discounts include one or more rebates, applicable rebate discounts may be presented as unequivocally distinct from the discount transaction price that will be charged to the provided payment method.

In response to a user electing to submit a discount transaction for processing, the discount server 170 may execute a merchant checkout process. For example, the transaction module 177 may effectuate one or more transactions with one or more merchants based on the discount transaction which the user elected. For example, the transaction module 177 may receive information indicative of a discount transaction for one or more items, a set of discounts (or sets, such as where the discount transaction corresponds to multiple constituent transactions), and from which merchant (or merchants) to effectuate an order for one or more items. The transaction module 177 may evaluate the set of discounts for a given order with a given merchant to determine which discount types are represented in the set of discounts. For example, if a stored value card discount is indicated, the transaction module 177 may provision a stored value card for a fulfilling merchant specified by the discount transaction. The stored value card (or a set of stored value cards) may be provisioned with a value corresponding to an estimated total merchant price (e.g., including shipping, tax, and cost of the items). For example, the transaction module 177 may provision or reserve one or more stored value cards from an exchange of the discount server 170 or provided by a third party to obtain a discounted price on the stored value cards relative to the estimated total merchant price. In some embodiments, a buffer may be added to the estimated price, or a final total merchant price may be determined by applying one or more discounts in the set of discounts of a type that affects total merchant pricing to a provisional cart having corresponding shipping details for the user. User shipping destination information may be obtained from a record 187 of the user or the user may be prompted to provide a full address corresponding to a shipping destination. Similarly, user payment information may be obtained from the user, and the user payment method may be pre-charged at the discount price indicated to the user prior to submitting the discount transaction.

The transaction module 177, based on set of applicable discounts (e.g., an optimal set) specified for the discount transaction, may select one or more scripts for executing a sequence of steps to trigger each of the discounts in a set of discounts. For example, a record of a merchant 185 may indicate one or more scripts encoding computer program operations to apply one or more of the different types of discounts identified to the set of discounts. The transaction module 177 may execute the sequence of steps, such as via a script configured to execute a browser instance, which may be a headless browser instance, to perform the above steps or execute one or more calls to an application program interface of a merchant to effectuate an order with the merchant based on supplied user information and stored value card information (or user payment information). An example script may route the browser instance or configure an API call to trigger any appropriate affiliate or tracking links, add the items of the discount transaction to a cart with the merchant, apply the relevant discount codes, apply user shipping (and optionally payment) information, apply one or more stored value cards (e.g., covering the checkout price with the merchant, such as to omit application of user payment information), and submit the transaction with the merchant. The above process may be repeated, such in instances where the discount transaction includes constituent transactions. For example, the above process may be performed for each constituent transaction in the set of constituent transaction, a given constituent transaction specifying a merchant and a corresponding set of discount codes to apply along with the estimated merchant price for provisioning the stored value card.

The transaction module 177 may be configured to charge a user payment method based on provided user payment information at the presented discount cost for the discount transaction. This may be effectuated as a hold for the discount cost until the transaction module 177 completes the discount transaction. In some cases, the transaction module 177 may determine whether the discount transaction may be completed within a threshold (e.g., to not exceed) amount at which the user payment method is charged, such as if one or more discounts is no longer valid. The transaction module 177 may provision one or more stored value cards on an exchange, or through a merchant for the discount transaction. In some embodiments, such as where a merchant does not accept a gift card, the transaction module 177 may provision a generic stored value card, like a stored value card of a credit card processor accepted by the merchant. The one or more transactions may be effectuated with the respective merchants by the transaction module 177 with provisioned stored value cards for the respective costs of the transactions required at checkout by the merchant. Prior to checkout, the transaction module 177 may be configured to execute a script based on the set of discounts applicable to a given transaction for a given merchant to apply each of the discounts in the set, such as by activation of an affiliate link or setting values, like a cookie value, for the browser executing the script to apply an affiliate or cash back discount, add the items specified by the given transaction for the given merchant, apply one or more coupon codes indicated in the set of discounts, input user shipping destination information, select shipping expediency option elected by the user, input one or more provisioned gift cards up to the total required cost specified by the merchant, and submit the order.

By disconnecting the user's checkout experience from merchant checkout flow, the price the customer actually gets charged may be completely independent from (but based on) the price the merchant receives. Accordingly, the discount can be controlled and set as high or as low as desired based on specified thresholds or incentives. Further, real-time discount AB testing may determine which metrics and optimizations drive which outcomes in real-time data about the impacts of different merchandising strategies that work for which merchants or users. For example, generated instances of discount transactions may be stored in a record and fulfillment of a generated discount transaction to a completed purchase may be indicated in the corresponding record. These factors may be provided as feedback to the discount module 175 by which model option data 190 may be determined to automatically adjust and dynamically generate unique discounts through feedback loops that target larger-level business outcomes, such as cash back offer budgets or overall spend on a discount transaction.

Figure 2:
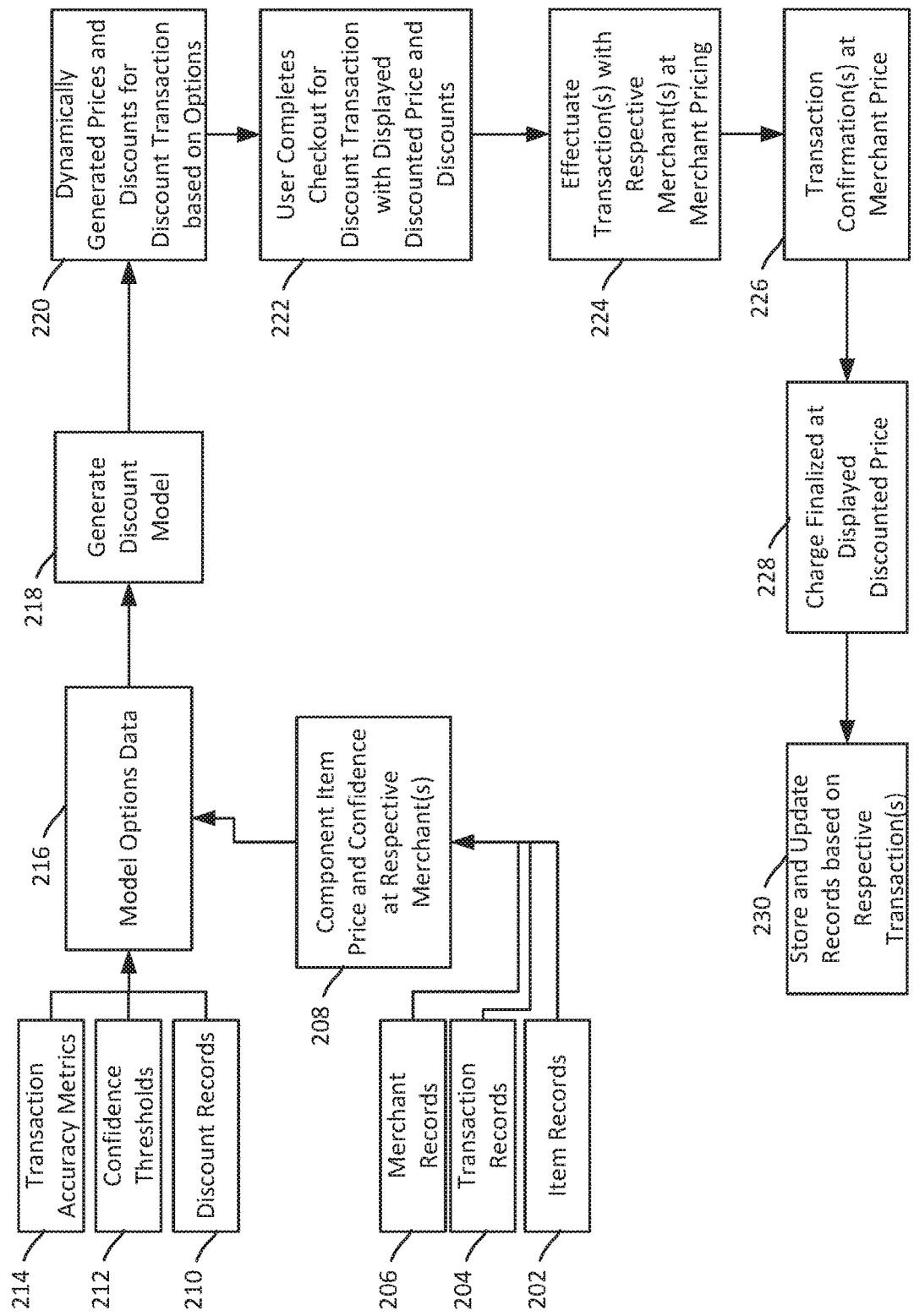
FIG. 2 illustrates an example flow diagram for dynamically generating an optimized transaction based on predictive bounding of optimizations in an objective function spanning multiple features, according to some example embodiments.

FIG. 2 illustrates an example flow diagram for dynamically generating an optimized transaction based on predictive bounding of optimizations in an objective function spanning multiple features, according to some example embodiments.

As shown, a plurality of records and information may be ingested by a computer program module to determine model options data 216 for generating discount models 218. In some embodiments, the computer program module may comprise one or more models trained on historical records to determine model options data 216. For example, a model may be trained on historical transaction records 204 to estimate component item pricing and associated price confidence for items based on their respective properties indicated in item records 202 and records of merchants 206 from which the items were purchased as indicated in the historical transaction records 204. In turn, the model may ingest items records 202 and merchant records 206 to estimate 208 current component item pricing and confidence at respective merchants. In some embodiments, component item pricing may be validated at a respective merchant for at least some items, such as to determine whether when an item is added to a cart with the merchant its component price (e.g., pre-discount) falls within the confidence interval price for the item.

A model for estimating 208 component item pricing and price confidence at respective merchants may be trained iteratively based on new transaction records 204, and validated for new item records 204 and records of merchants 206, such as when an item is indicated as available at a given merchant based on updates in the records or addition of new item or merchant records. In some embodiments, the result is a model configured to receive an input item record and determine component item pricing with a confidence based on whether other items are present in the order, shipping information, availability at merchants, current pricing of those merchants, etc., and output an estimated item price (e.g., total cost of purchasing the item) and confidence level for the different merchants. Model options data 216, like bounds of pricing for items included in a transaction for a given merchant may, in turn, be based on the estimated prices and confidence levels for the merchant that takes into account historical order makeup and historical pricing of items at the merchant. In turn, for example, estimated price and confidence levels for item prices may be determined by the trained model for a given item indicated in an item record and its availability from a given merchant. Estimated pricing and confidence for an item, or collection of items, with different ones of the merchants may be determined based on model outputs. For example, outputs of the model may indicate pricing and confidences levels for prices of different items individually and in combination with other items and for different configurations of an item with different merchants responsive to the information encoded in item records (e.g., like a feature vector). Thus, for example, model options data 216 may be utilized to determine which merchant to select to back a transaction in view of available discounts based on estimated pricing and confidence in pricing pre-discount (e.g., as a merchant may choose to list an item cheaper than another merchant and should be taken into account in combination with available discounts for determining discount transactions).

In some embodiments, transaction records 204 may be interrogated to determine transaction accuracy metrics and confidence thresholds, such as based on disparity between estimated discount cost and indicated in a transaction record for a transaction and actual transaction cost. A transaction accuracy metric 214 may be based on an average difference between estimated discount cost for a transaction and actual transaction cost for transaction with a given merchant. A confidence threshold 212 may be based on a normal distribution, such as one or more standard deviations, for which actual transaction costs fell at or below estimated discount cost with a given merchant, and the threshold may correspond to a determined confidence that a given transaction will fall below an estimated discount cost with the merchant. The confidence thresholds 212 and accuracy metrics 214 for respective ones of the merchants may be indicative of the reliability of effectuating discounts with the respective merchants, which may take into account inaccuracies in discounts within discount records, e.g., prior to validation, as obtained from one or more sources. In some cases, the above information may be determined with higher granularity by discount type, source, and the like, as indicated by transaction records 204 for which respective sets of discounts were determined to apply to respective transactions.

As shown, an example embodiment of a computer model may ingest estimates 208 of component item pricing and pricing confidence at respective merchants, transaction accuracy metrics 214, confidence thresholds 212, and discount records 210 to determine model options data 216. The model options data 216 may specify options for generating 218 a discount model for a desired transaction. Training of the computer model to generate model option data 216 may be based on historical records, like a portion of historical records, such as a training set, to minimize error in a set of validation records. Initially, training records may be determined based on test transactions with respective merchants, like seed records, and populated with fulfilled transaction records (e.g., corresponding to user purchase though the system) over time. Validation records may include historical records and may also include numerous test transactions (e.g., where one or more discounts for a non-fulfilled transaction may be applied, like up to pre-checkout confirmation, and provide a refined estimate of discount application). In some cases, in test transactions, one or more discounts of particular types are validated and other types which cannot be validated without fulfillment are determined to be validated based on type and determined applicability based on historical transactions which did validate the discount. In various embodiments, the computer model may be trained to generated model options data 216, a plurality of discount models 218 are generated based on historical transactions and validated test transactions, e.g., by specifying a desired transaction with information corresponding to a historical transaction or validated test transaction. In turn, a variety of output discount transactions may be obtained from the respective discount models and validated up to the point of fulfillment (e.g., to accurately determine transaction cost with a merchant) to measure error and determine accuracy of discount models 218 generated based on the model options data 216. Thus, for example, training to generate model options data 216 may incorporate current discount records 210, which correspond to those discounts which may be selected to a set of discounts for generated 218 discount models. The computer model by which the model options data 216 is generated may be iteratively trained to reduce error in the underlying model option data 216 for selecting discounts, merchants, and items by which the discount models are generated 218 for a desired transaction.

As previously described, generated discount models 218 may be relative lightweight scripts or functions generated for processing modifications within a reduced option set determined for a desired transaction based on the model options data 216. Thus, for example, the underlying model options data 216 may be particularly robust and apt to generating discount models on the fly based on desired transaction data in numerous sessions in which different user devices submit information about desired transactions. Models, like the above described model, may be trained with various, model-appropriate, training algorithms, including Baum-Welch, gradient descent, and the like. In some embodiments, models are trained by a background offline task using one or more machine learning techniques (e.g., model-appropriate training algorithms). For example, models may be trained to generate an estimated price for items with merchants and bounded price and discount offers based on estimate item price and discount records indicating applicable discounts to an item at a merchant. Some embodiments may execute a gradient descent optimization to reduce the error rate and select appropriate weighting and the bias values within the model. In some cases, a predictive model (e.g., a vector of weights) may be calculated as a batch process run periodically. Some embodiments may construct the model by, for example, assigning randomly selected weights or biases, calculating an error amount with which the model describes the consumption data and rates of change in that error as a function of the weights in the model in the vicinity of the current weight (e.g., a derivative, or local slope), and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration. The resulting, trained model, e.g., a vector of weights or biases, may be stored in memory and later retrieved for application to new calculations on newly updated records, periodically to confirm accuracy or update reliability of different types of discounts or item pricing with different merchants and changes in taxation or shipping rates, or discounts or promotions which end at particular times. In some embodiments, specific factors within a geographic region like shipping zip code, state, tax, etc. and need not be accounted for directly by imputing those external factors, but rather on the basis of past price and discount historical records indicate shipping costs trends or changes in application of tax pertaining to users in those areas when receiving items from different merchants. For example, trends may be determined based on changes in transaction accuracy metrics 214, confidence thresholds 212, and component item pricing and confidence at respective merchants. However, embodiments contemplate querying databases to determine applicable taxes. Model weights may be on a sliding scale or binary, e.g., a rate based on item weight vs application of tax based on shipping origin and destination. Some embodiments may execute a Hidden Markov Model. In some cases, each hidden state may be mapped to a bounds of an estimated item price or price and discounts option from a merchant based on shipping origin or destination. In some embodiments, a model may be trained with the Baum-Welch algorithm, and the bounds of a price and discounts of one or more items may be inferred with the Viterbi algorithm. In some cases, a subset of the training set may be withheld in each of several iterations of training a model to cross validate the model. In some cases, a model may be trained periodically, e.g., monthly, in advance of use of the model. In some cases, training a model may include pre-calculating and caching solutions to a sampling of permutations or all permutations of possible inputs.

Discount records 210 may be populated and obtained for different merchants, and may indicate information like whether the merchant issues stored value cards, current discount codes and properties thereof (e.g., exclusions, specific qualifying items or criteria) for the merchant, current non-discount code based offers and properties thereof (e.g., exclusions, specific qualifying items or criteria) for the merchants, applicable affiliate links or cash back partnerships with the merchant (which may be affected through a third party), and other discount information discussed herein. For example, some discount records may specify items qualifying for rebates and other offers.

Estimated 208 component item prices may be processed based on discount records 210 to determine estimate component discount item prices and confidence thereof with a given merchant along with criteria for discounts which may be unmet by the item individually. Bounds on model options data 216 may be defined by program goals and estimate price confidence level relative to estimated discount. For example, up to 10×$20 discount for new users, which may be based on a more lax confidence restrictions (e.g., 80% vs 90% confidence in estimate discount transaction price) for generating 218 discount models. The model options data 216 may be generated periodically for generating 218 discount models for dynamically generating prices and discounts for a discount transaction that is based on a desired user transaction.

A user device 105 may access the discount server information, like item records, such as via a web site hosted by the server and retrieve for display within a browser of a user device or via an API of the server called by a native application of the user device. In some cases, the user device may query the server with information about items, like one or more item identifiers, by which one or more item records may be identified. A web site or native application may include a user interface displaying information from item records by which a user may select items and properties thereof for a desired transaction to order the items. User information including location, purchase history and specific user information (e.g., such as new user, relative lifetime value, user preferences, brand affinity, etc.) may be stored in a user record. In response to a user selection via the interface to generate a price and discount for a given selection of items which are identified in item records for a desired transaction, a user record of the user may be accessed. The item records and user record may be processed in accordance with the model options data 216 to generate 218 a discount model specific to the user and items indicated by the desired transaction. For example, the discount model may be generated 218 on page load, or in response to receiving the request via an API, within the bounds and thresholds defined within the model options data 216 for generating discount models. The discount model may be configured to dynamically generate 220 prices and discount for a discount transaction based on available options provided for configuring the discount transaction. Thus, for example, the discount model includes a price and discount for a recommended discount transaction initially presented to the user based on the desired transaction as well as a price and discount for other configurations of the discount transaction based on defined changes in price and discount for configurable options. These user-definable options may include shipping/color/size options and also options like purchasing from a different merchant or swapping out items for similar alternatives, and the price and discount reflected for option selections may be based on the set of discounts applicable to a discount transaction or a constituent transaction of the discount transaction determined to satisfy the criteria of the discounts in the set.

Thus, for example, a single price and discount is displayed within the user interface based on the selection of options, and selection of different option causes a corresponding change in the displayed price and discount based on the changes in the underlaying transaction(s) that provide an optimal price and discount corresponding to the selected option (or set of options). The user may elect to checkout 222 for the discount transaction with the displayed discounted price based on the applicable discounts. The discount server 170 may provide a checkout process by which the user may provide information to complete checkout with the discount server 170 at the discounted price for the discount transaction. For example, the user may utilize their user device to confirm payment and shipping information for the discount transaction through the server via the interface of the native application or the interface of the web site within browser, completing the apparent order process to the user. Once the user places the order, the discount server 170 may place a hold on the provided user payment method, like a credit card, for discounted price of the discounted transaction and confirm the submission of the order. In turn, the discount server 170 may effectuate 224 one or more transactions with respective merchants at merchant pricing as specified by the discount model for the given options selected for the discount transaction. The server may asynchronously process one or more transaction corresponding to the discounted transaction with a respective merchant specified for a transaction, such as based on the shipping information provided by the user. Marchant payment may be effected with one or more stored value cards provisioned to fully cover the pricing of the transaction at the merchant. Once the merchant confirms processing of the one or more transaction of the discount transaction 226 at final merchant pricing, the discount server may finalize 228 the charge to the user payment method at the discounted price for the discount transaction (e.g., unless one or more thresholds were exceeded and the order may be cancelled or the user charged for a lesser price). At that point, the merchant also sends a confirmation directly to the user of their order (e.g., based on user email or phone number provided with user shipping or payment information) or the discount server 170 may receive and provide conformation to the user. In turn, the discount server 170 may capture information about a transaction with a merchant, e.g., via order confirmation page, and may track any discounts based on transaction completion, like affiliate link cash bash and the like and store 230 and update one or more records based on the one or more fulfilled transactions.

Figure 3:
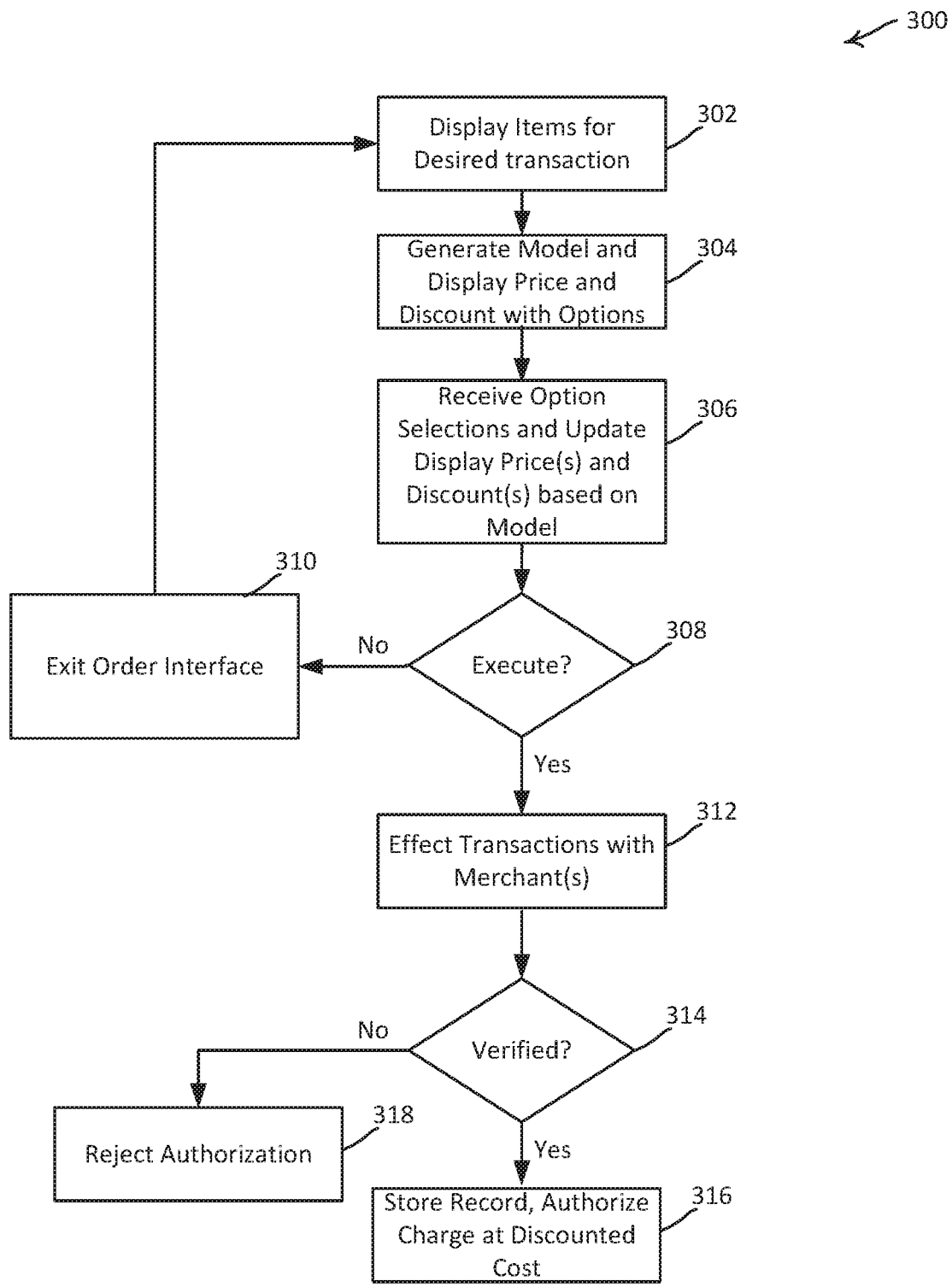
FIG. 3 illustrates an example flow diagram for generating discount transactions that are dynamically created through transaction optimization, according to an example embodiment.

FIG. 3 illustrates an example flow diagram of a process 300 for generating discount transactions that are dynamically created through transaction optimization, according to an example embodiment. For example, a discount server 170 may perform one or more of the illustrated operations.

In step 302, a plurality of items may be displayed by which a user may specify a desired transaction including one or more items. The items may correspond to items represented in item records. An item represented in an item records may be an item available from one or more merchants for which one or more discounts, like a set of discounts, may be applicable. A selection to obtain a price and discount for a transaction including one or more desired items may be received.

In step 304, a discount model may be generated to display pricing and discounts for one or more configurations of an item or items based on the desired item(s). In some embodiments, the discount model is generated based on model option data, user information such as shipping destination information, and a selection of item records based on the desired items. The selected item records may include the desired items (or similar items) and additional or other items by which one or more discounts in discount records may be satisfied, and merchants from which combinations of the items may be obtained. The discount model may be generated based on the information to indicate different configurations of options for one or more items of a discount transaction that satisfied a set of discounts. In some embodiments, the discount model may be generated in response to a request for a discount transaction received from a user device and presented in association with a page load of a web page or generated for providing responses to requests received at an API based on determined option data.

In step 306, option selections may be received by the discount model which may determine and update display priced and discounts based on model outputs. The discount server 170 may receive indication of user selection to execute 308 a discount transaction for a given set of options. In turn, the discount server 170 may generate a checkout interface by which the user provides or confirms payment and shipping information the discount server 170 charges the user payment method at the discounted price displayed for the discount transaction. Alternatively a user may exit 310 the interface or elect to select different desired options at which point the model may be discarded and the option selection interface exited 310.

In step 312, such as in response to a request to execute the transaction, the process may effectuate one or more transaction with respective merchants based on the discount transaction for the option selection provided by the user and then verify 314 success of the execution. For example, the discount server 170 may execute one or more script to effectuate one or more transaction with respective ones of the merchants, such as by applying respective sets of discounts as indicated by the model for the discount transaction.

If the transactions with the merchants are not verified, the discount server 170 may reject to the authorization 318 of the charge to the user payment method. If the transaction with the merchants are verified, the discount server 170 may stored one or more records and authorize the charge to the user payment method at the discounted cost which was displayed to the user.

Figure 4:
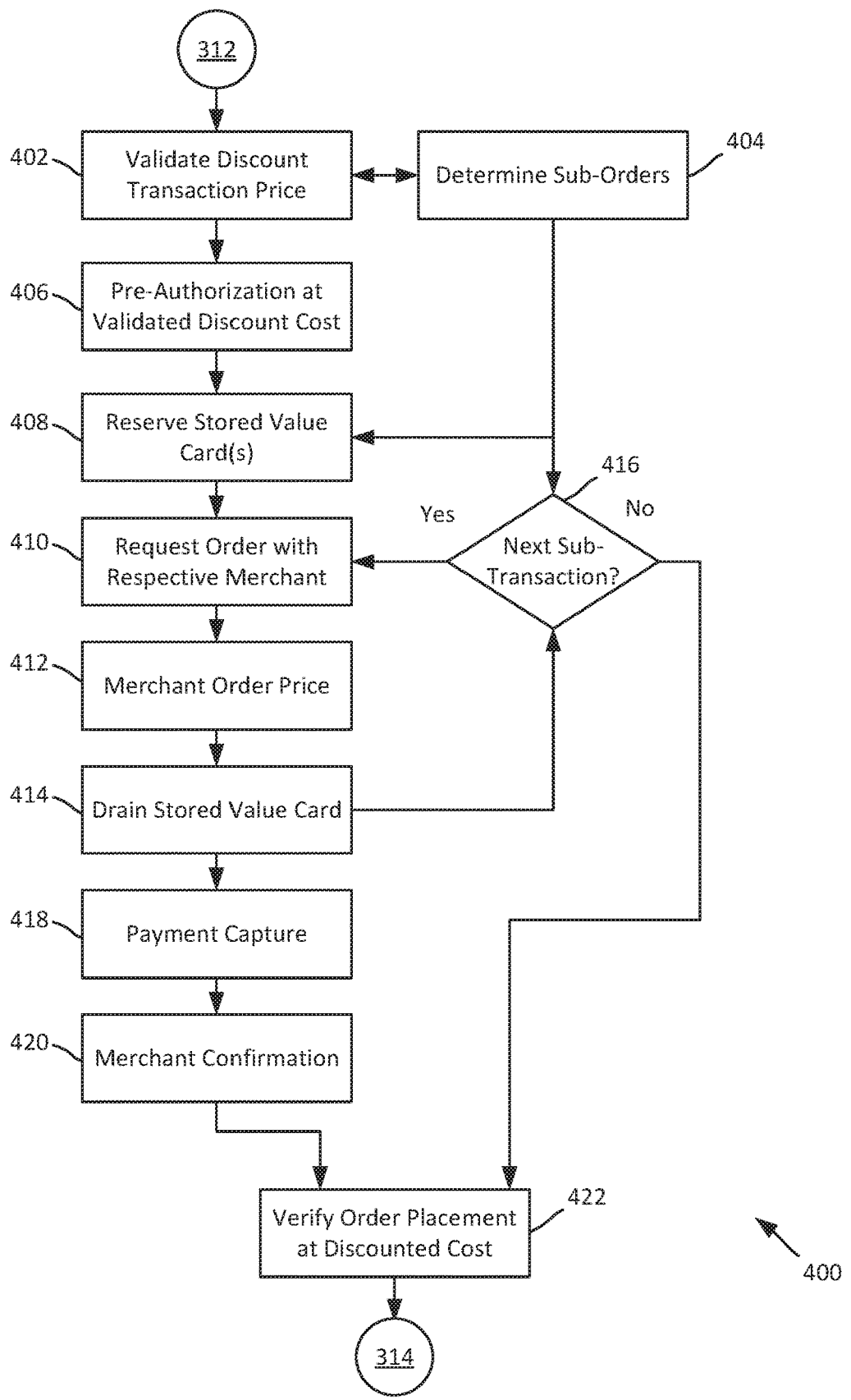
FIG. 4 illustrates an example flow diagram for effectuating a discount transaction with application of sets of discounts determined through transaction optimization to streamline user experience for obtaining desired items, according to an example embodiment.

FIG. 4 illustrates an example flow diagram of a process 400 for effectuating a discount transaction with application of sets of discounts determined through transaction optimization to streamline user experience for obtaining desired items, according to an example embodiment. In some embodiments, the process 400 illustrated by FIG. 4 may be implemented between or in association with steps 312 and 314 of FIG. 3.

As shown in FIG. 4, in a step 401, the discount server 170 may validate a discount transaction price. In some example, embodiments, such as for a discount transaction for which constituent transactions are indicated, sub orders 404 of the discount transaction, may be determined and validated. Thus, for example, for the constituent transactions, the determined discount transaction price may be validated based on the validation of constituent transactions in the aggregate for sub-orders with respective ones of the different merchants.

If the discount transaction is validated, e.g., the discount price falls within a threshold cost determined for execution of the discount transaction with one or more merchants, the user provided payment information may be pre-authorized 406. The pre-authorization 406 may be submitted at the discounted cost which was displayed to the user and determined as falling within a threshold for validation the discounts transaction, e.g., rather than actual merchant cost. In some embodiments, discount transactions may be assumed to be valid or falling within the threshold based on bounds for generating discount models by which the discount transaction was presented to the user with the associated discount cost.

In a step 408, the process may include provisioning one or more stored value cards, such as a stored value card for the one or more merchants specified for the discount transaction. In some embodiments, a stored value card (or a set thereof) may be provisioned for a given merchant as indicated by a corresponding one of the sub-orders, such as for an amount which fulfills an estimated, determined, or validated cost with the given merchant, optionally provisioned with a buffer.

In step 410, the process the may request an order with a respective merchant based on execution of a script which applies one or more discounts in a set of discount to the order, which may be discounts in addition to a stored valued card discounted specified in the set. For example, in step 410, the process may activate an affiliate link in association with the request with the respective merchant for a cash back offer or affiliate discount. For example, a cookie value may be set based on a tracking value for a headless browser executing a script by which discounts are applied for the merchant.

In step 410, the process may obtain a merchant order price, such as by adding the items indicated for the order with the merchant to a cart of the merchant. For example, the script may be configured to access a given web page (e.g., by specific URL or search based on item identifier) corresponding to the item and select an add to cart web element associated with the item along with optionally specifying an amount to add to cart or query an API of a server of the merchant to add an item or quantity of item to a cart. With items added to the cart, the script may apply one or more discount codes specified in the set of discounts corresponding to the transaction with the merchant. With the discount codes applied, the script may input user shipping information in accordance with a checkout process of the merchant, and a merchant order price for the item with applied discounts, like discount code, reflected (and in some cases affiliate discount reflected). In other words, the process obtained a merchant order price 412 which must be satisfied with the merchant to submit the order.

In step 414, the script may apply the one or more provisioned stored values operable with the merchant to drain the stored value cards for the total merchant order price 412 that must be satisfied. In turn, the script may submit the order.

If there are multiple constituent transactions to the discount transaction, corresponding sub-transactions for sub-orders may be iterated through until no more sub-transactions for-sub orders 416 exist. Iteration through the sub-transaction may occur asynchronously via concurrent execution of respective scripts for respective merchants for respective items and respective applicable sets of discounts.

Steps 418 and 420 in the process may occur after the submission of one or more orders with respective merchants. For example, step 418 may identify payment capture corresponding to submission of a transaction with a merchant, and step 420 may include the verification of merchant confirmation for the order. The process may listen for capture and confirmation corresponding to each sub-transaction prior to verifying order placement at discounted cost in step 422.

Figure 5C:
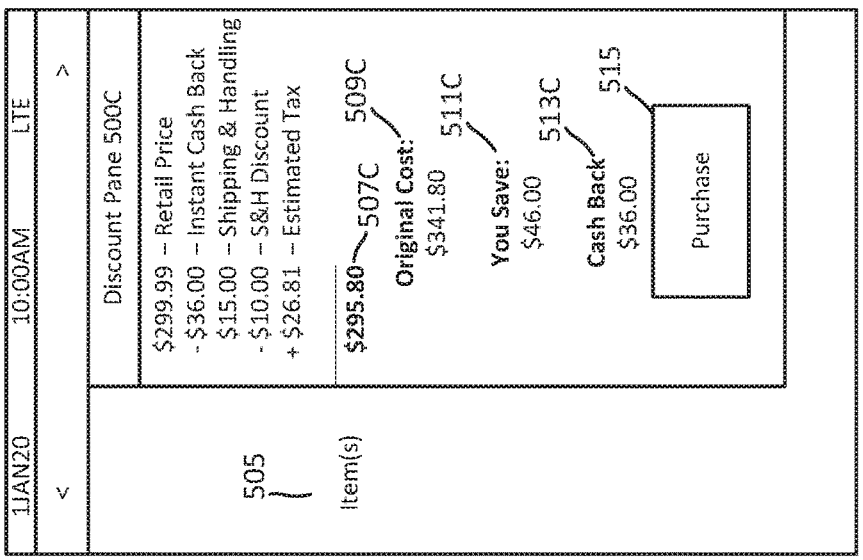
FIG. 5A, FIG. 5B, and FIG. 5C illustrate examples of user interfaces including a price plus discount transaction offer dynamically created for a user through transaction optimization, according to an example embodiment.
Figure 5B:
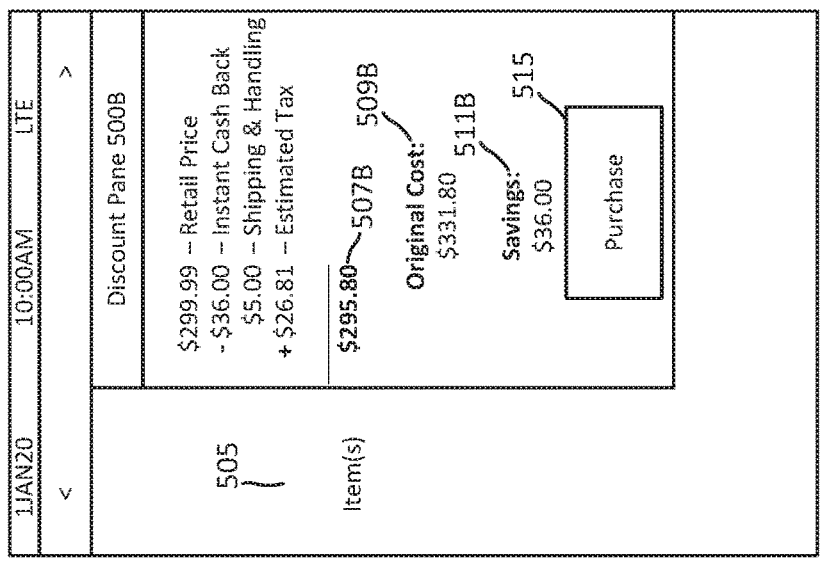
Figure 5A:
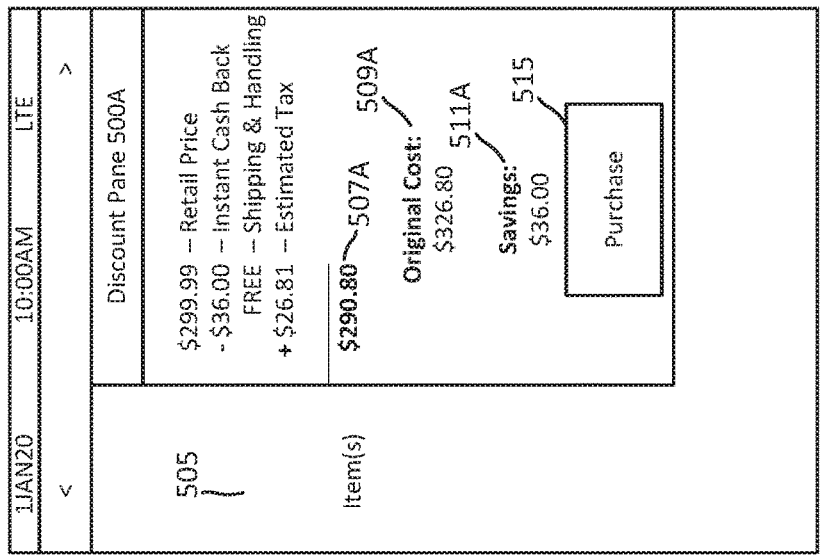

FIG. 5A, FIG. 5B, and FIG. 5C illustrate examples of user interfaces including a price plus discount transaction offer dynamically created for a user through transaction optimization, according to an example embodiment.

The example user interfaces may correspond to a user interface provided in web content, such as by a server (e.g., like a discount server 170), that may be rendered by a browser application 123 to provide the interface. The web content may include one or more scripts, like functional code, or other data structures, by which operations may be executed on the user device on or within the web content. The web content, such as one or more scripts, may also cause the user device to generate a query to an API (e.g., like an API 173 of the server 170), which may return data responsive to the request, and displayed content may be updated based on the returned data. The browser may also request new or updated web content from the server, or submit data to the server, such as via the API or via one or more request. In some embodiments, a browser may be a standalone application and access the web content by browsing to a website. In other examples, browser functionality may be incorporated in another application and request web content from the server and render the web content within an interface of the other application. In some cases, an application, like a toolbar or plugin, may be executed by a web browser and the toolbar may cause the browser to request the web content, which may be rendered within the toolbar interface. In other examples, a user interface may be provided by an application and content items and other data may be retrieved via the API 173. Thus, for example, a user device may execute an application, like a native application 125, and the native application may exchange data with the server 170 via the API to update one or more interfaces, receive data for processing on the user device, or request processing of data. Accordingly, the various depicted interfaces may be provided in a variety of different ways to display data like that described below.

As shown in FIG. 5A, an example interface may include an items pane 505 that includes one or more items, such as items which a user desires to purchase. Items displayed with the items pane may be populated in a variety of different ways. For example, the items may correspond to a shopping cart with the above described discount server 170 of a discount server, which the user populates by selecting one or more items via one or more other interfaces indicative of items for which the discount server maintains item records. In other words, the items within the items pane 505 may be populated by user selection of one or more items while browsing items for which the discount server maintains item records. In other example, the items pane 505 may be populated with items which the user selects from a website of a merchant for which the discount server maintains one or more of item records, merchant records, or discount records. For example, a toolbar or plugin may detect and identify to a user which items the discount server 170 is operable to identify applicable discounts for and optimize a discount transaction including the item.

Discount pane 500A illustrates an example price plus discount for a discount transaction. A discount transaction cost 507A is presented for items included in the discount transaction, which may be based on a determined application of a set of discounts for one or more transactions with respective merchants. An original cost 509A, such as without the application of a set of discounts may be displayed along with the savings 511A. In turn, the user may elect to effect a purchase 515 for the items.

As shown in discount pane 500B of FIG. 5B, a discount model may generate an updated discount transaction cost 507B, such as based on a change in a user optioned shipping method. A discount model may update the original cost 509B and savings 511B along with the discount transaction cost 507B based on the option selection (e.g., faster shipping for $5 over free shipping). In turn, the user may elect to effect a purchase 515 for the items with the different option configuration based on the discount transaction cost 507B.

As shown in discount pane 500C of FIG. 5C, one or more discount types may be indicated based on option selections. For example, discount pate 500C indicates an instant cash back 513C and a total savings based on the instance cash back and shipping and handing discount, relative to the original cost 509C. As with the above examples, a user may elect to effect a purchase for the item based on the discount transaction cost 507C.

Figure 6:
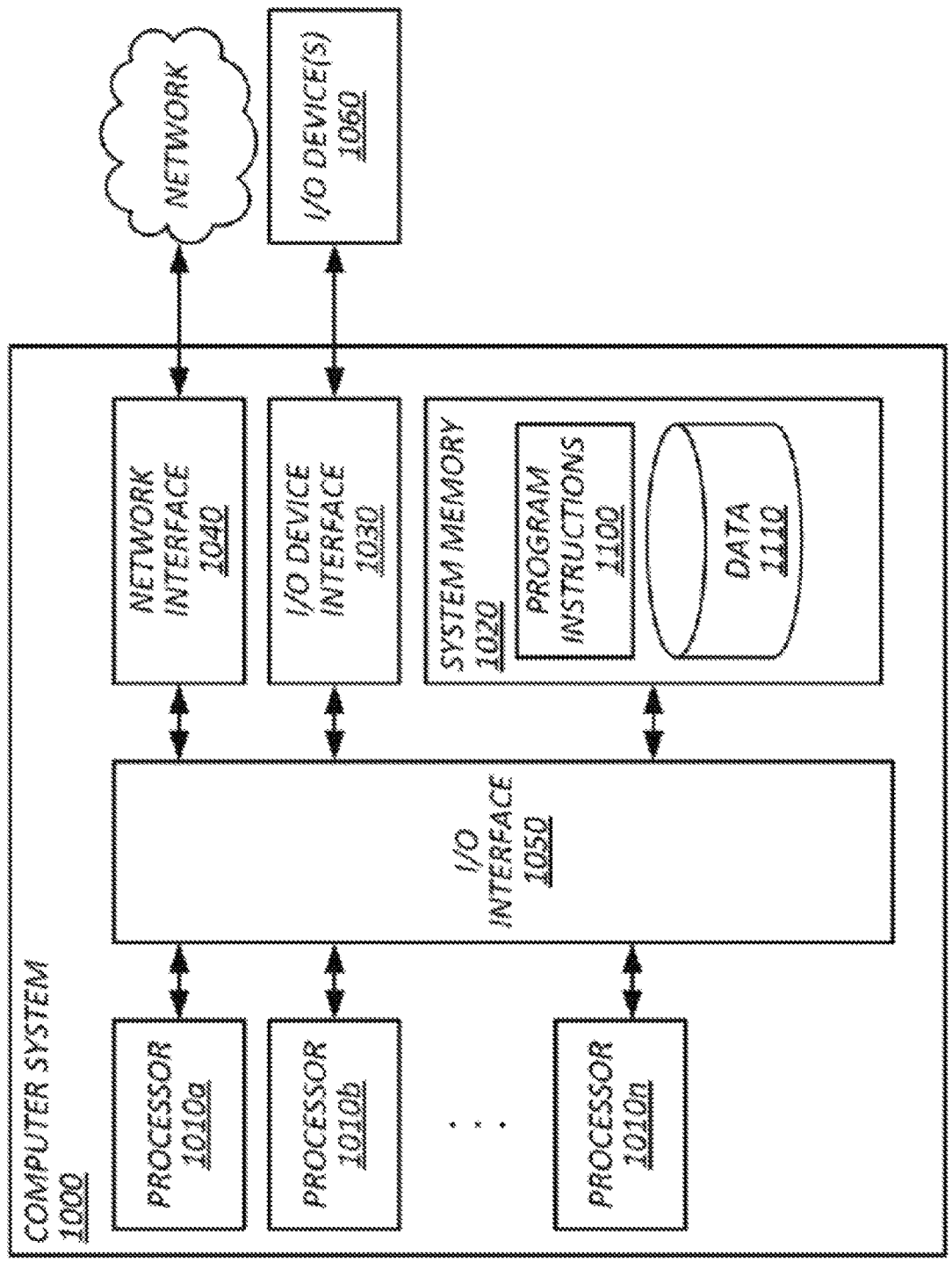
FIG. 6 illustrates an example of a computing device upon which the present techniques may be implemented.

FIG. 6 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000. For example, the computing system 1000, components thereof, or a collection of computing systems, may be operable to perform one or more operations and/or included in one or more entities to perform those functions. For example, computing systems like computing system 1000 may be utilized to store and process data like that described with reference to and illustrated in FIGS. 1-5 and may be organized in a client-server architecture that includes a multitude of clients, such as user devices. Clients may interact with a server, and that server may further interact with other servers to retrieve data and effectuate operations based on the retrieved data, and those operations may include causing another server or servers to effectuate some other operation(s). The different clients and servers may be computing devices or systems having one or more components similar to those illustrated for the example computing system 1000. Thus, one or more computing systems 1000 may be utilized to perform operations with respect to price plus discount optimization for a transaction using techniques disclosed herein. Example elements of an example computing system are discussed in greater detail below.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, where certain U.S. patents, U.S. patent applications, or other materials (e.g., articles) have been incorporated by reference, the text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing computing program instructions that when executed by one or more processors cause the processors to perform operations comprising: obtaining, with a computer system, a set of item records corresponding to a plurality of items, an item record in the set indicating one or more merchants offering a corresponding item to users; obtaining, with the computer system, a set of discount records corresponding to a plurality of discounts, a discount record in the set indicating one or more discounts applicable to a merchant or an item, each of the one or more discounts having a respective discount type; determining, with the computer system, associations between discounts and items based on the set of items records and the set of discount records, at least some of the items associated with at least two discounts having different discount types; training, with the computer system, based at least in part on the set of item records and the set of discount records, a computer model to determine a discount transaction with a given merchant by estimating the discount transaction provides a lower price for an item of a desired transaction responsive to an application of an optimal set of discounts with the given merchant relative to prices corresponding to a plurality of other merchants and a plurality of other sets of discounts applicable to respective ones of the other merchants; after training, obtaining, with the computer system, a desired transaction and a geolocation of a user, wherein the desired transaction is indicative of one or more items a user desires to purchase; obtaining, with the computer system, one or more item records corresponding to the one or more items based on the desired transaction and data indicative of the associations of the item records with discounts; determining, with the computer system, with the trained computer model, based on the user record, the item records, and the associated discounts, at least one discount transaction comprising an estimated discounted price and a price for the one or more items responsive to an optimal set of discounts determined for the discount transaction with a given one of the merchants; and in response to receiving a confirmation for the discount transaction, automatically, with the computer system, effectuating a transaction with the given one of the merchants for one or more of the items provided by the merchant based on the discount transaction and the user record by applying each of two or more discounts in the optimal set of discounts.

2. The medium of embodiment 1, wherein: applying at least one of the discounts in the set comprises provisioning a first discount of a first discount type that satisfies a transaction price with the given one of the merchants, the transaction price with the given one of the merchants being different from and greater than the estimated discount price.

3. The medium of embodiment 2, wherein the transaction price is unaffected by at least one of the other applied discounts in the set.

4. The medium of any of embodiments 1-3, wherein training, based at least in part on the first and second sets of records, comprises: training a computer model configured to determine a discount transaction comprising of a set of constituent transactions, a constituent transaction estimated to provide a given price for one or more items with a given merchant responsive to an application of a set of discounts with the given merchant out of a plurality of other merchants and a plurality of other sets of discounts applicable to respective ones of the other merchants, the set of constituent transactions comprising two or more constituent transactions estimated to provide a greater discount on a plurality of items across at least two merchants based on a respective optimal set of discounts for each merchant than for any single transaction with a single merchant based on an optimal set of discounts for the single merchant.

5. The medium of embodiment 4, wherein automatically effectuating the discount transaction with the given one of the merchants comprises: processing a given one of the two or more constituent transactions by: provisioning one or more stored value cards redeemable at a respective merchant specified by the given one of the two or more constituent transactions with a collective stored value corresponding to or exceeding a transaction price with the merchant for corresponding ones of the items; and executing a sequence of steps to apply each of two or more discounts in the optimal set of discounts determined for the given one of the constituent transactions.

6. The medium of embodiment 5, wherein: one or more steps in the sequence are effectuated by executing a script encoding computer program operations for a browser instance to apply different types of discounts including at least one affiliate or tracking link and one discount code identified to the set of discounts by: triggering the at least one affiliate or tracking link, adding the one or more items of the given one of the constituent transactions to a cart with the merchant, applying the discount code, applying user shipping information based on the user record, applying the one or more stored value cards, and submitting the transaction with the merchant, and the discount transaction is effectuated by iteratively processing the other constituent transactions in the set of constituent transactions.

7. The medium of embodiment 4, wherein the at least one discount transaction is encoded in a data structure, the data structure comprising: one or more values and functions for modifying the price and the estimated discount price of a set of constituent transactions of the at least one discount transaction based on a determined selection of items that may be added to the discount transaction or swapped with one or more of the items of the discount transaction, and wherein an item swapped with one or more of the items of the discount transaction or added to the discount transaction is added to a one of the constituent transactions in the set of constituent transactions based on a determination that adding the item to the one of the constituent transactions provides a greater discount than adding the item to another constituent transaction in the set of constituent transactions.

8. The medium of embodiment 7, wherein: the determination that adding the item to the one of the constituent transactions provides a greater discount than adding the item to another constituent transaction in the set of constituent transactions is based on an output of at least one function including at least one of the values encoded in the data structure, the at least one of the values associated with the item or a merchant providing the item.

9. The medium of any of embodiments 1-8, wherein determining an optimal set of discounts with a given merchant out of a plurality of other merchants, comprises: determining whether any discounts having unmet criteria are available with the given merchant, the optimal set of discounts including at least one discount having unmet criteria by a discount transaction; and determining a value corresponding to the unmet criteria is within a threshold amount and satisfying the unmet criteria, wherein satisfying the unmet criteria includes increasing a pre-discount cost of the transaction with the given merchant up to the threshold amount by selection of an addition or optioning of an item or a higher cost shipping option based on one or more of the user record, the item records, and the associated discounts or other item records having associated discounts.

10. The medium of any of embodiments 1-9, wherein training, based at least in part on the first and second sets of records, comprises: training a computer model configured to evaluate properties of a desired transaction based on a third set of records corresponding to past transactions, the third set of records comprising records indicative of one or more of delivery timing, shipping rates, tax rates, item cost or discount amount for each discount type for the one or more items specified in past transactions, the computer model comprising one or more thresholds for discounts applied based on item cost for two or more items relative to shipping cost or taxes to determine whether a desired transaction should be broken into two or more constituent transactions based on reduction of cost compared to a single transaction including the items contained in the two or more constituent transactions.

11. The medium of any of embodiments 1-10, wherein: the at least one discount transaction comprising an estimated discounted price and a price for the one or more items indicates a discounted cost reflecting savings for the one or more items compared to an undiscounted price of the desired transaction for the one or more items.

12. The medium of any of embodiments 1-11, wherein the at least one discount transaction is encoded in a data structure, the data structure comprising: one or more values and functions for modifying the price and the estimate discount price of the discount transaction based on a determined selection of items that may be added to the discount transaction or swapped with one or more of the items of the discount transaction.

13. The medium of embodiment 12, wherein: an item swapped with one or more of the items of the discount transaction or added to the discount transaction satisfies criteria for one or more discounts in the optimal set of discounts for the discount transaction with the given one of the merchants.

14. The medium of embodiment 12, wherein: an item swapped with one or more of the items of the discount transaction or added to the discount transaction is associated with one or more discounts in the optimal set of discounts for the discount transaction with the given one of the merchants.

15. The medium of any of embodiments 1-14, further comprising: receiving a user selection to complete a purchase based on the discount transaction, the user charged at the estimated discounted price; and obtaining payment confirmation for the discount transaction.

16. The medium of any of embodiments 1-15, wherein: automatically effectuating the discount transaction with the given one of the merchants comprises: provisioning one or more stored value cards redeemable at the merchant specified by the discount transaction with a collective stored value corresponding to or exceeding a transaction price with the given one of the merchants for the one or more of the items; and executing a sequence of steps to apply each of two or more discounts in the optimal set of discounts determined for the discount transaction; one or more steps in the sequence are effectuated by executing a script encoding computer program operations for a browser instance to apply different types of discounts including at least one affiliate or tracking link and one discount code identified to the optimal set of discounts by: triggering the at least one affiliate or tracking link, adding the one or more of the items of the discount transaction to a cart with the merchant, applying the discount code, applying user shipping information based on the user record, applying the one or more stored value cards, and submitting the transaction with the merchant.

17. A method comprising the operations of any of embodiments 1-16.

What is claimed is:

1. A tangible, non-transitory, machine-readable medium storing computing program instructions that when executed by one or more processors cause the processors to perform operations comprising:
    obtaining, with a computer system, a set of item records corresponding to a plurality of items, an item record in the set indicating one or more merchants offering a corresponding item to users;
    obtaining, with the computer system, a set of discount records corresponding to a plurality of discounts, a discount record in the set indicating one or more discounts applicable to a merchant or an item, each of the one or more discounts having a respective discount type;
    determining, with the computer system, associations between discounts and items based on the set of items records and the set of discount records, at least some of the items associated with at least two discounts having different discount types;
    training, with the computer system, based at least in part on the set of item records and the set of discount records, a computer model to determine a discount transaction with a given merchant by estimating the discount transaction provides a lower price for an item of a desired transaction responsive to an application of an optimal set of discounts with the given merchant relative to prices corresponding to a plurality of other merchants and a plurality of other sets of discounts applicable to respective ones of the other merchants;
    after training, obtaining, with the computer system, a desired transaction and a geolocation of a user, wherein the desired transaction is indicative of one or more items a user desires to purchase;
    obtaining, with the computer system, one or more item records corresponding to the one or more items based on the desired transaction and data indicative of the associations of the item records with discounts;
    determining, with the computer system, with the trained computer model, based on the user record, the item records, and the associated discounts, at least one discount transaction comprising an estimated discounted price and a price for the one or more items responsive to an optimal set of discounts determined for the discount transaction with a given one of the merchants; and
    in response to receiving a confirmation for the discount transaction, automatically, with the computer system, effectuating a transaction with the given one of the merchants for one or more of the items provided by the merchant based on the discount transaction and the user record by applying each of two or more discounts in the optimal set of discounts.

2. The medium of claim 1, wherein:
    applying at least one of the discounts in the set comprises provisioning a first discount of a first discount type that satisfies a transaction price with the given one of the merchants, the transaction price with the given one of the merchants being different from and greater than the estimated discount price.

3. The medium of claim 2, wherein the transaction price is unaffected by at least one of the other applied discounts in the set.

4. The medium of claim 1, wherein training, based at least in part on the first and second sets of records, comprises:
    training a computer model configured to determine a discount transaction comprising of a set of constituent transactions, a constituent transaction estimated to provide a given price for one or more items with a given merchant responsive to an application of a set of discounts with the given merchant out of a plurality of other merchants and a plurality of other sets of discounts applicable to respective ones of the other merchants, the set of constituent transactions comprising two or more constituent transactions estimated to provide a greater discount on a plurality of items across at least two merchants based on a respective optimal set of discounts for each merchant than for any single transaction with a single merchant based on an optimal set of discounts for the single merchant.

5. The medium of claim 4, wherein automatically effectuating the discount transaction with the given one of the merchants comprises:
    processing a given one of the two or more constituent transactions by:
        provisioning one or more stored value cards redeemable at a respective merchant specified by the given one of the two or more constituent transactions with a collective stored value corresponding to or exceeding a transaction price with the merchant for corresponding ones of the items; and
        executing a sequence of steps to apply each of two or more discounts in the optimal set of discounts determined for the given one of the constituent transactions.

6. The medium of claim 5, wherein:
    one or more steps in the sequence are effectuated by executing a script encoding computer program operations for a browser instance to apply different types of discounts including at least one affiliate or tracking link and one discount code identified to the set of discounts by:
        triggering the at least one affiliate or tracking link,
        adding the one or more items of the given one of the constituent transactions to a cart with the merchant,
        applying the discount code,
        applying user shipping information based on the user record,
        applying the one or more stored value cards, and
        submitting the transaction with the merchant, and
    the discount transaction is effectuated by iteratively processing the other constituent transactions in the set of constituent transactions.

7. The medium of claim 4, wherein the at least one discount transaction is encoded in a data structure, the data structure comprising:
    one or more values and functions for modifying the price and the estimated discount price of a set of constituent transactions of the at least one discount transaction based on a determined selection of items that may be added to the discount transaction or swapped with one or more of the items of the discount transaction, and
    wherein an item swapped with one or more the items of the discount transaction or added to the discount transaction is added to a one of the constituent transactions in the set of constituent transactions based on a determination that adding the item to the one of the constituent transactions provides a greater discount than adding the item to another constituent transaction in the set of constituent transactions.

8. The medium of claim 7, wherein:
the determination that adding the item to the one of the constituent transactions provides a greater discount than adding the item to another constituent transaction in the set of constituent transactions is based on an output of at least one function including at least one of the values encoded in the data structure, the at least one of the values associated with the item or a merchant providing the item.

9. The medium of claim 1, wherein determining an optimal set of discounts with a given merchant out of a plurality of other merchants, comprises:
determining whether any discounts having unmet criteria are available with the given merchant, the optimal set of discounts including at least one discount having unmet criteria by a discount transaction; and
determining a value corresponding to the unmet criteria is within a threshold amount and satisfying the unmet criteria, wherein satisfying the unmet criteria includes increasing a pre-discount cost of the transaction with the given merchant up to the threshold amount by selection of an addition or optioning of an item or a higher cost shipping option based on one or more of the user record, the item records, and the associated discounts or other item records having associated discounts.

10. The medium of claim 1, wherein training, based at least in part on the first and second sets of records, comprises:
training a computer model configured to evaluate properties of a desired transaction based on a third set of records corresponding to past transactions, the third set of records comprising records indicative of one or more of delivery timing, shipping rates, tax rates, item cost or discount amount for each discount type for the one or more items specified in past transactions, the computer model comprising one or more thresholds for discounts applied based on item cost for two or more items relative to shipping cost or taxes to determine whether a desired transaction should be broken into two or more constituent transactions based on reduction of cost compared to a single transaction including the items contained in the two or more constituent transactions.

11. The medium of claim 1, wherein:
the at least one discount transaction comprising an estimated discounted price and a price for the one or more items indicates a discounted cost reflecting savings for the one or more items compared to an undiscounted price of the desired transaction for the one or more items.

12. The medium of claim 1, wherein the at least one discount transaction is encoded in a data structure, the data structure comprising:
one or more values and functions for modifying the price and the estimate discount price of the discount transaction based on a determined selection of items that may be added to the discount transaction or swapped with one or more of the items of the discount transaction.

13. The medium of claim 12, wherein:
an item swapped with one or more of the items of the discount transaction or added to the discount transaction satisfies criteria for one or more discounts in the optimal set of discounts for the discount transaction with the given one of the merchants.

14. The medium of claim 12, wherein:
an item swapped with one or more of the items of the discount transaction or added to the discount transaction is associated with one or more discounts in the optimal set of discounts for the discount transaction with the given one of the merchants.

15. The medium of claim 1, further comprising:
receiving a user selection to complete a purchase based on the discount transaction, the user charged at the estimated discounted price; and
obtaining payment confirmation for the discount transaction.

16. The medium of claim 1, wherein:
automatically effectuating the discount transaction with the given one of the merchants comprises:
provisioning one or more stored value cards redeemable at the merchant specified by the discount transaction with a collective stored value corresponding to or exceeding a transaction price with the given one of the merchants for the one or more of the items; and
executing a sequence of steps to apply each of two or more discounts in the optimal set of discounts determined for the discount transaction;
one or more steps in the sequence are effectuated by executing a script encoding computer program operations for a browser instance to apply different types of discounts including at least one affiliate or tracking link and one discount code identified to the optimal set of discounts by:
triggering the at least one affiliate or tracking link,
adding the one or more of the items of the discount transaction to a cart with the merchant,
applying the discount code,
applying user shipping information based on the user record,
applying the one or more stored value cards, and
submitting the transaction with the merchant.

17. The medium of claim 1, wherein the operations comprise:
steps for determining an optimal combination of discounts and merchant; and
steps for effectuating a transaction.

18. A tangible, non-transitory, machine-readable medium storing computing program instructions that when executed by one or more processors cause the processors to perform operations comprising:
obtaining, with a computer system, a set of item records corresponding to a plurality of items, an item record in the set indicating one or more merchants providing a corresponding item to users;
obtaining, with the computer system, a set of discount records corresponding to a plurality of discounts, a discount record in the set indicating one or more discounts applicable to a merchant or an item, each of the one or more discounts having a respective discount type;
determining, with the computer system, associations between discounts and items based on the set of items records and the set of discount records, at least some of the items associated with at least two discounts having different discount types;

training, with the computer system, based at least in part on the sets of records, a computer model configured to determine a discount transaction comprising of a set of constituent transactions, a constituent transaction estimated to provide a given price for one or more items with a given merchant responsive to an application of a set of discounts with the given merchant out of a plurality of other merchants and a plurality of other sets of discounts applicable to respective ones of the other merchants, the set of constituent transactions comprising two or more constituent transactions estimated to provide a greater discount on a plurality of items across at least two merchants based on a respective optimal set of discounts for each merchant than for any single transaction with a single merchant based on an optimal set of discounts for the single merchant;

obtaining, with the computer system, a desired transaction, the desired transaction indicative of at least two items a user desires to purchase, the user associated with a user record indicative of a location of the user;

obtaining, with the computer system, one or more item records corresponding to the at least two items based on the desired transaction and data indicative of the associations of the item records with discounts;

determining, with the computer system, with the trained computer model, based on the user record, the item records, and the associated discounts, a discount transaction comprising an estimated discount price and a price for the at least two items responsive to a plurality of discounts, the plurality of discounts comprises a optimal set of discounts for each one of at least two constituent transactions each corresponding to a different one of the merchants;

in response to receiving a confirmation for the discount transaction, effecting, with the computer system, a transaction for each of the at least two constituent transactions with the respective merchant for the at least one item provided by the merchant based on the corresponding constituent transaction and the user record by applying each of two or more discounts in the respective optimal set of discounts.

19. The medium of claim 18, wherein determining the discount transaction comprises:

determining whether any discounts having unmet criteria are available with the merchants corresponding to the discount transaction, the optimal set of discounts for at least one of the constituent transactions including at least one discount having unmet criteria by the constituent transaction; and determining a value corresponding to the unmet criteria is within a threshold amount and satisfies the unmet criteria, wherein satisfying the unmet criteria includes increasing a pre-discount cost of the constituent transaction with the corresponding merchant up to the threshold amount by selection of an addition or optioning of an item or a higher cost shipping option based on one or more of the user record, the item records, and the associated discounts or other item records having associated discounts.

20. A method, comprising:

obtaining, with a computer system, a set of item records corresponding to a plurality of items, an item record in the set indicating one or more merchants offering a corresponding item to users;

obtaining, with the computer system, a set of discount records corresponding to a plurality of discounts, a discount record in the set indicating one or more discounts applicable to a merchant or an item, each of the one or more discounts having a respective discount type;

determining, with the computer system, associations between discounts and items based on the set of items records and the set of discount records, at least some of the items associated with at least two discounts having different discount types;

training, with the computer system, based at least in part on the set of item records and the set of discount records, a computer model to determine a discount transaction with a given merchant by estimating the discount transaction provides a lower price for an item of a desired transaction responsive to an application of an optimal set of discounts with the given merchant relative to prices corresponding to a plurality of other merchants and a plurality of other sets of discounts applicable to respective ones of the other merchants;

after training, obtaining, with the computer system, a desired transaction and a geolocation of a user, wherein the desired transaction is indicative of one or more items a user desires to purchase;

obtaining, with the computer system, one or more item records corresponding to the one or more items based on the desired transaction and data indicative of the associations of the item records with discounts;

determining, with the computer system, with the trained computer model, based on the user record, the item records, and the associated discounts, at least one discount transaction comprising an estimated discounted price and a price for the one or more items responsive to an optimal set of discounts determined for the discount transaction with a given one of the merchants; and in response to receiving a confirmation for the discount transaction, automatically, with the computer system, effectuating a transaction with the given one of the merchants for one or more of the items provided by the merchant based on the discount transaction and the user record by applying each of two or more discounts in the optimal set of discounts.

* * * * *